United States Patent
Rupasinghe et al.

(10) Patent No.: US 12,413,271 B2
(45) Date of Patent: Sep. 9, 2025

(54) DISTRIBUTED MIMO CALIBRATION

(71) Applicant: Samsung Electronics Co., Ltd., Suwon-si (KR)

(72) Inventors: R A Nadisanka Perera Rupasinghe, McKinney, TX (US); Yang Li, Plano, TX (US); Thuy Van Nguyen, Dallas, TX (US); Namjeong Lee, Yongin-si (KR); Dongwook Kim, Suwon-si (KR); Kyung-joong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 18/416,510

(22) Filed: Jan. 18, 2024

(65) Prior Publication Data

US 2024/0429974 A1    Dec. 26, 2024

Related U.S. Application Data

(60) Provisional application No. 63/522,945, filed on Jun. 23, 2023.

(51) Int. Cl.
*H04B 7/0413* (2017.01)
*H04B 17/11* (2015.01)
*H04B 17/21* (2015.01)

(52) U.S. Cl.
CPC ........... *H04B 7/0413* (2013.01); *H04B 17/11* (2015.01); *H04B 17/21* (2015.01)

(58) Field of Classification Search
CPC ...... H04B 7/0413; H04B 17/11; H04B 17/21; H04B 7/0456
See application file for complete search history.

(56) References Cited

U.S. PATENT DOCUMENTS

| 10,547,358 B2 | 1/2020 | Forenza et al. |
| 11,528,069 B2 | 12/2022 | Lee et al. |
| 11,632,152 B2 | 4/2023 | Zhang et al. |

(Continued)

OTHER PUBLICATIONS

"3rd Generation Partnership Project; Technical Specification Group Radio Access Network; Evolved Universal Terrestrial Radio Access (E-UTRA); Physical channels and modulation (Release 16)", 3GPP TS 36.211 V16.4.0, Dec. 2020, 249 pages.

(Continued)

*Primary Examiner* — Vineeta S Panwalkar

(57) ABSTRACT

A method of operating a network entity includes receiving, via a first TRP and a second TRP, information associated with a SRS from a UE, and estimating a channel based on the information associated with the SRS. The method further includes, for N iterations: transmitting, via a first CSI-RS port from a CSI-RS resource, from the first TRP, a CSI-RS; transmitting, via a second CSI-RS port from the CSI-RS resource, from the second TRP, the CSI-RS with a controlled phase offset; receiving a PMI report associated with the CSI-RS including a measured phase offset between the first CSI-RS port and the second CSI-RS port; and updating the controlled phase offset, based on the measured phase offset. The method further includes, after the N iterations, based on the controlled phase offset and the measured phase offset, determining a phase mis-match for phase calibration between the first TRP and the second TRP.

20 Claims, 20 Drawing Sheets

(56) References Cited

U.S. PATENT DOCUMENTS

| | | | |
|---|---|---|---|
| 11,705,975 B2 | 7/2023 | Raghavan et al. | |
| 2013/0250876 A1* | 9/2013 | Hugl | H04B 7/0639 370/329 |
| 2022/0271802 A1 | 8/2022 | Lee et al. | |
| 2022/0286178 A1 | 9/2022 | Lee et al. | |

OTHER PUBLICATIONS

"3rd Generation Partnership Project; Technical Specification Group Radio Access Network; Evolved Universal Terrestrial Radio Access (E-UTRA); Multiplexing and channel coding (Release 16)", 3GPP TS 36.212 V16.4.0, Dec. 2020, 254 pages.

"LTE; Evolved Universal Terrestrial Radio Access (E-UTRA) Physical layer procedures (3GPP TS 36.213 version 16.4.0 Release 16)", ETSI TS 136 213 V16.4.0, Feb. 2021, 577 pages.

"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 V16.3.0, Dec. 2020, 142 pages.

"LTE; Evolved Universal Terrestrial Radio Access (E-UTRA); Radio Resource Control (RRC); Protocol specification (3GPP TS 36.331 version 16.3.0 Release 16)", ETSI TS 136 331 V16.3.0, Jan. 2021, 1089 pages.

"3rd Generation Partnership Project; Technical Specification Group Radio Access Network; NR; Physical channels and modulation (Release 16)", 3GPP TS 38.211 v16.4.0, Dec. 2020, 133 pages.

"3rd Generation Partnership Project; Technical Specification Group Radio Access Network; NR; Multiplexing and channel coding (Release 16)", 3GPP TS 38.212 v16.4.0, Dec. 2020, 152 pages.

"3rd Generation Partnership Project; Technical Specification Group Radio Access Network; NR; Physical layer procedures for control (Release 16)", 3GPP TS 38.213 v16.4.0, Dec. 2020, 181 pages.

"3rd Generation Partnership Project; Technical Specification Group Radio Access Network; NR; Physical layer procedures for data (Release 16)", 3GPP TS 38.214 v16.4.0, Dec. 2020, 169 pages.

"5G; NR; Physical layer measurements (3GPP TS 38.215 version 16.4.0 Release 16)", ETSI TS 138 215 V16.4.0, Jan. 2021, 31 pages.

"3rd Generation Partnership Project; Technical Specification Group Radio Access Network; NR; Medium Access Control (MAC) protocol specification (Release 16)", 3GPP TS 38.321 v16.3.0, Dec. 2020, 156 pages.

"3rd Generation Partnership Project; Technical Specification Group Radio Access Network; NR; Radio Resource Control (RRC) protocol specification (Release 16)", 3GPP TS 38.331 v16.3.1, Jan. 2021, 932 pages.

* cited by examiner

| Codebook index | Number of layers $v$ | |
|---|---|---|
| | 1 | 2 |
| 0 | $\frac{1}{\sqrt{2}}\begin{bmatrix}1\\1\end{bmatrix}$ | $\frac{1}{2}\begin{bmatrix}1 & 1\\1 & -1\end{bmatrix}$ |
| 1 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 2 | $\frac{1}{\sqrt{2}}\begin{bmatrix}1\\-1\end{bmatrix}$ | -- |
| 3 | $\frac{1}{\sqrt{2}}\begin{bmatrix}1\\-j\end{bmatrix}$ | -- |

PMI reporting is allowed only for rank=1

FIG. 11

*CSI-ResourcePeriodicityAndOffset*

The IE CSI-ResourcePeriodicityAndOffset is used to configure a periodicity and a corresponding offset for periodic and semi-persistent CSI resources, and for periodic and semi-persistent reporting on PUCCH. Both the periodicity and the offset are given in number of slots. The periodicity value slots4 corresponds to 4 slots, value slots5 corresponds to 5 slots, and so on.

*CSI-ResourcePeriodicityAndOffset* information element

```
-- ASN1START
-- TAG-CSI-RESOURCEPERIODICITYANDOFFSET-START

CSI-ResourcePeriodicityAndOffset ::=    CHOICE {
    slots4          INTEGER (0..3),
    slots5          INTEGER (0..4),
    slots8          INTEGER (0..7),
    slots10         INTEGER (0..9),
    slots16         INTEGER (0..15),
    slots20         INTEGER (0..19),
    slots32         INTEGER (0..31),
    slots40         INTEGER (0..39),
    slots64         INTEGER (0..63),
    slots80         INTEGER (0..79),
    slots160        INTEGER (0..159),
    slots320        INTEGER (0..319),
    slots640        INTEGER (0..639)
}

-- TAG-CSI-RESOURCEPERIODICITYANDOFFSET-STOP
-- ASN1STOP
```

```
csi-ReportingBand               CHOICE {
    subbands3                       BIT STRING(SIZE(3)),
    subbands4                       BIT STRING(SIZE(4)),
    subbands5                       BIT STRING(SIZE(5)),
    subbands6                       BIT STRING(SIZE(6)),
    subbands7                       BIT STRING(SIZE(7)),
    subbands8                       BIT STRING(SIZE(8)),
    subbands9                       BIT STRING(SIZE(9)),
    subbands10                      BIT STRING(SIZE(10)),
    subbands11                      BIT STRING(SIZE(11)),
    subbands12                      BIT STRING(SIZE(12)),
    subbands13                      BIT STRING(SIZE(13)),
    subbands14                      BIT STRING(SIZE(14)),
    subbands15                      BIT STRING(SIZE(15)),
    subbands16                      BIT STRING(SIZE(16)),
    subbands17                      BIT STRING(SIZE(17)),
```

| Bandwidth part (PRBs) | Subband size (PRBs) |
|---|---|
| < 24 | N/A |
| 24 – 72 | 4, 8 |
| 73 – 144 | 8, 16 |
| 145 – 275 | 16, 32 |

FIG. 19

DISTRIBUTED MIMO CALIBRATION

CROSS-REFERENCE TO RELATED APPLICATION(S) AND CLAIM OF PRIORITY

This application claims priority under 35 U.S.C. § 119(e) to U.S. Provisional Patent Application No. 63/522,945 filed on Jun. 23, 2023. The above-identified provisional patent application is hereby incorporated by reference in its entirety.

TECHNICAL FIELD

This disclosure relates generally to wireless networks. More specifically, this disclosure relates to apparatuses and methods for distributed multiple-input multiple-output (MIMO) calibration.

BACKGROUND

The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure provides apparatuses and methods for distributed MIMO calibration.

In one embodiment, a network entity is provided. The network entity includes a memory and a processor operably coupled to the memory. The processor is configured to receive, via a first transmit-receive point (TRP) and a second TRP, information associated with a sounding reference signal (SRS) from a user equipment (UE), and estimate a channel based on the information associated with the SRS. The processor is further configured to, for N iterations: transmit, via a first channel state information reference signal (CSI-RS) port from a first CSI-RS resource, from the first TRP, a first CSI-RS; transmit, via a second CSI-RS port from the first CSI-RS resource, from the second TRP, the first CSI-RS with a first controlled phase offset; receive, from the UE, a first precoding matrix indicator (PMI) report associated with the first CSI-RS including a first measured phase offset between the first CSI-RS port and the second CSI-RS port; and update the first controlled phase offset, based on the first measured phase offset. The processor is further configured to, after the N iterations, based on the first controlled phase offset and the first measured phase offset, determine a first phase mis-match for phase calibration between the first TRP and the second TRP.

In another embodiment, a UE is provided. The UE includes a processor configured to generate PMI reports, and a transceiver operably coupled to the processor configured to transmit a SRS. The processor is further configured to, for N iterations: receive, via a first CSI-RS port from a first CSI-RS resource, from a first TRP, a first CSI-RS; receive, via a second CSI-RS port from the first CSI-RS resource, from a second TRP, the first CSI-RS with a first controlled phase offset; and transmit a first PMI report associated with the first CSI-RS including a first measured phase offset between the first CSI-RS port and the second CSI-RS port.

In yet another embodiment, a method of operating a network entity is provided. The method includes receiving, via a first TRP and a second TRP, information associated with a SRS from a UE, and estimating a channel based on the information associated with the SRS. The method further includes, for N iterations: transmitting, via a first CSI-RS port from a first CSI-RS resource, from the first TRP, a first CSI-RS; transmitting, via a second CSI-RS port from the first CSI-RS resource, from the second TRP, the first CSI-RS with a first controlled phase offset; receiving, from the UE, a first PMI report associated with the first CSI-RS including a first measured phase offset between the first CSI-RS port and the second CSI-RS port; and updating the first controlled phase offset, based on the first measured phase offset. The method further includes, after the N iterations, based on the first controlled phase offset and the first measured phase offset, determining a first phase mis-match for phase calibration between the first TRP and the second TRP.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 10 illustrates an example of a Type I single-panel 2-port codebook according to embodiments of the present disclosure;

FIG. 11 illustrates an example RRC parameter twoTX-CodebookSubsetRestriction according to embodiments of the present disclosure;

FIG. 14 illustrates an example of periodicity for CSI reporting according to embodiments of the present disclosure;

FIG. 19 illustrates an example of different options for csi-ReportingBand and different sub-band sizes according to embodiments of the present disclosure;

DETAILED DESCRIPTION

Figure 1:
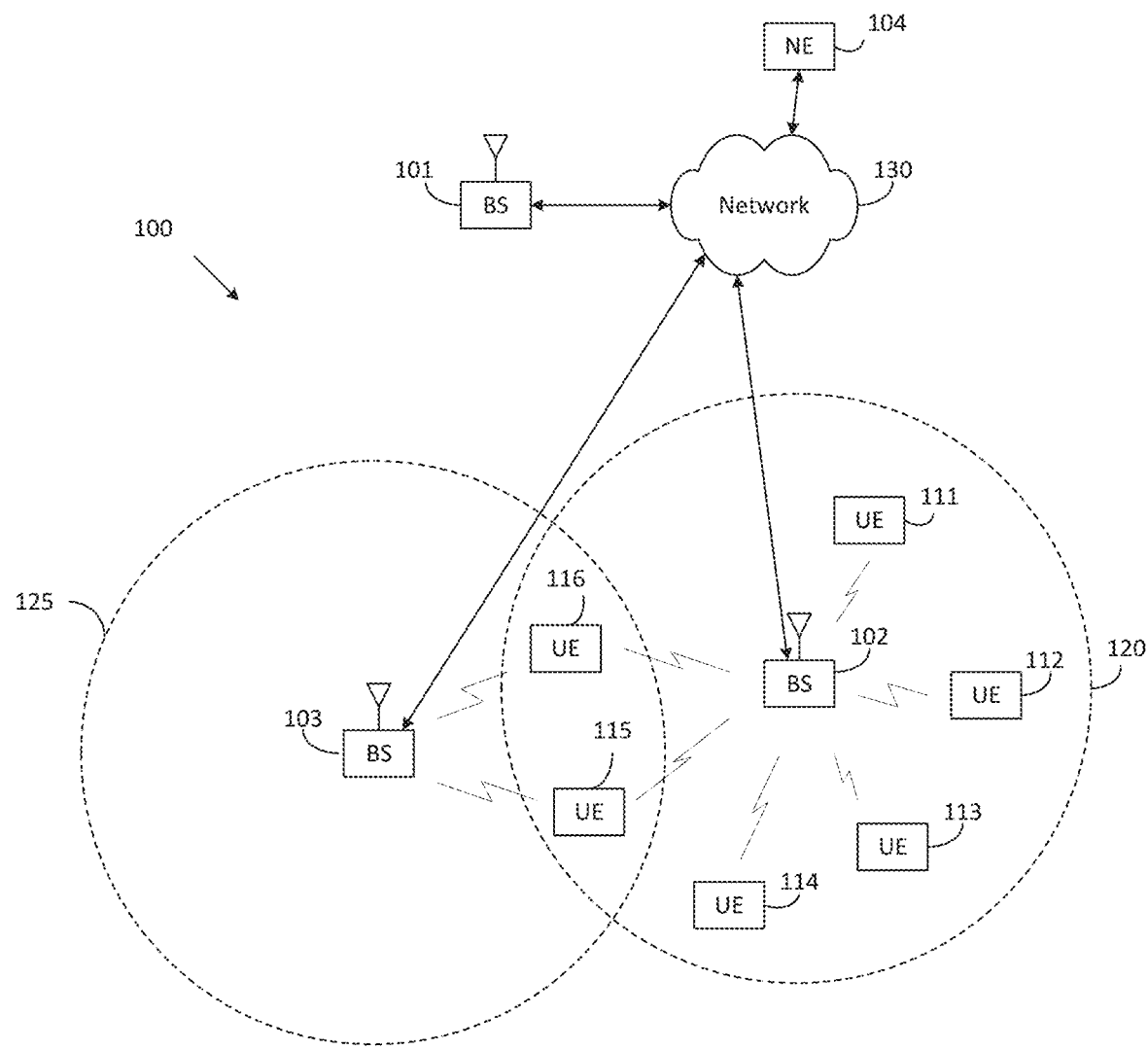
FIG. 1 illustrates an example wireless network according to embodiments of the present disclosure.

FIGS. 1 through 23, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

The following documents and standards descriptions are hereby incorporated by reference into the present disclosure as if fully set forth herein:

[1] 3GPP TS 36.211 v16.4.0, "E-UTRA, Physical channels and modulation."
[2] 3GPP TS 36.212 v16.4.0, "E-UTRA, Multiplexing and Channel coding."
[3] 3GPP TS 36.213 v16.4.0, "E-UTRA, Physical Layer Procedures."
[4] 3GPP TS 36.321 v16.3.0, "E-UTRA, Medium Access Control (MAC) protocol specification."
[5] 3GPP TS 36.331 v16.3.0, "E-UTRA, Radio Resource Control (RRC) Protocol Specification."
[6] 3GPP TS 38.211 v16.4.0, "NR, Physical channels and modulation."
[7] 3GPP TS 38.212 v16.4.0, "NR, Multiplexing and Channel coding."
[8] 3GPP TS 38.213 v16.4.0, "NR, Physical Layer Procedures for Control."
[9] 3GPP TS 38.214 v16.4.0, "NR, Physical Layer Procedures for Data."
[10] 3GPP TS 38.215 v16.4.0, "NR, Physical Layer Measurements."
[11] 3GPP TS 38.321 v16.3.0, "NR, Medium Access Control (MAC) protocol specification."
[12] 3GPP TS 38.331 v16.3.1, "NR, Radio Resource Control (RRC) Protocol Specification."

FIGS. 1-4 below describe various embodiments implemented in wireless communications systems and with the use of orthogonal frequency division multiplexing (OFDM) or orthogonal frequency division multiple access (OFDMA) communication techniques. The descriptions of FIGS. 1-4 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the network entity (NE) 104, the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 and NE 104 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the LUE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for supporting distributed MIMO calibration. In certain embodiments, network entity 104 includes circuitry, programing, or a combination thereof, to support distributed MIMO calibration. In certain embodiments, one or more of the gNBs 101-103 includes circuitry, programing, or a combination thereof, to support distributed MIMO calibration.

Although FIG. 1 illustrates one example of a wireless network, various changes may be made to FIG. 1. For example, the wireless network could include any number of gNBs, network entities, and any number of UEs in any suitable arrangement. Also, the gNB 101 could communicate directly with any number of UEs and provide those UEs with wireless broadband access to the network 130. Similarly, each gNB 102-103 could communicate directly with the network 130 and network entity 104 and provide UEs with direct wireless broadband access to the network 130. Further, the gNBs 101, 102, and/or 103 and/or network entity 104 could provide access to other or additional external networks, such as external telephone networks or other types of data networks.

Figure 2:
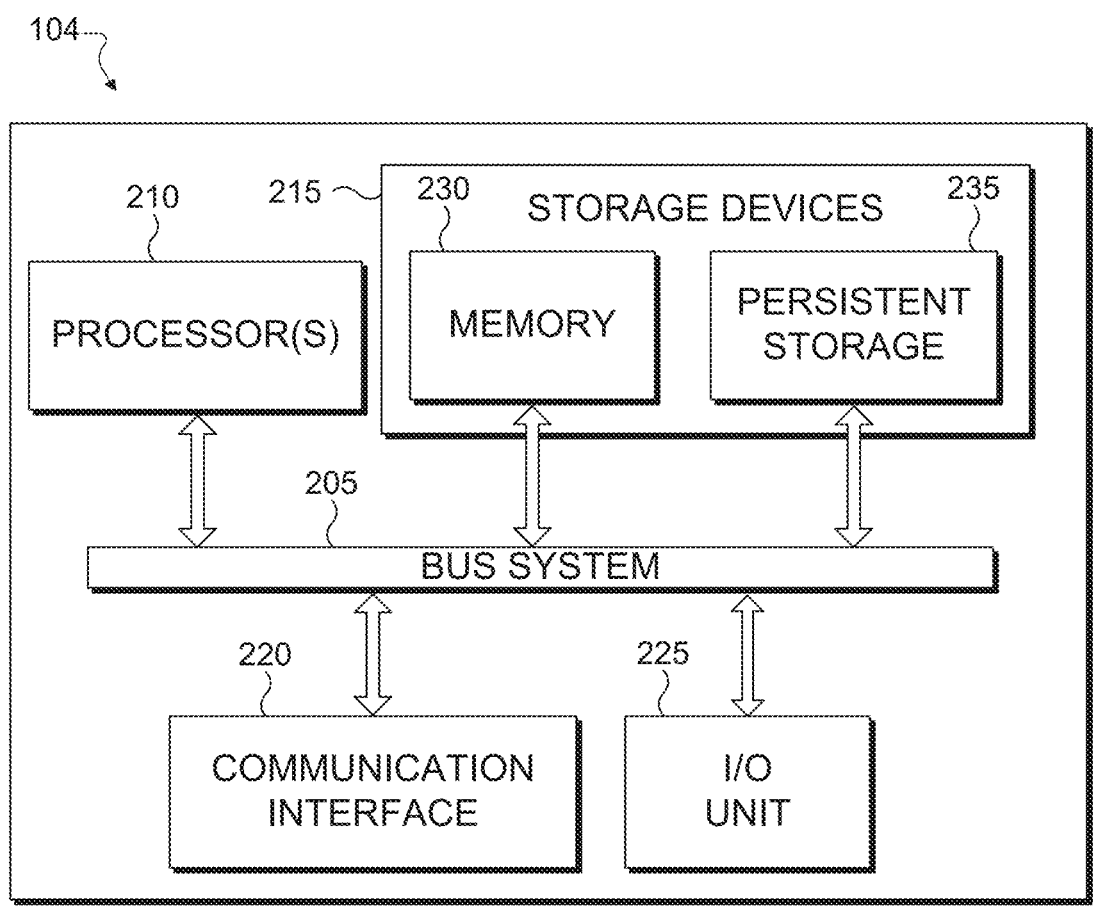
FIG. 2 illustrates an example network entity according to embodiments of the present disclosure.

FIG. 2 illustrates an example network entity (NE) 104 according to embodiments of the present disclosure. The embodiment of the NE 104 illustrated in FIG. 2 is for illustration only. However, NEs come in a wide variety of configurations, and FIG. 2 does not limit the scope of this disclosure to any particular implementation of an NE.

The network entity 104 can represent one or more local computing resources, remote computing resources, clustered computing resources, components that act as a single pool of seamless computing resources, a cloud-based computing resource, a virtualized computing resource, and the like. The network entity 104 can be accessed by one or more of the gNBs 101-103 and UEs 111-116 of FIG. 1 or another network entity.

As shown in FIG. 2, the network entity 104 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can execute processes to support PMI feedback-based calibration in distributed MIMO.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for supporting phase and timing mis-match calibration in distributed MIMO. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit operation instructions to another device such as one of gNBs 101, 102, and 103.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the network entity 104 occur via a network connection.

While the various components of network entity 104 are illustrated as discrete components such as processor 210, memory 230, and communications interface 220, all components or a subset of components of network entity 104 may be implemented as virtual components in a virtual resource, such as a virtual machine, a virtual server, software emulation, hardware emulation, and the like. In some embodiments, network entity 104 may be a virtual resource. In some embodiments, network entity 104 may be implemented entirely as computer program code operating on a separate apparatus.

In some circumstances, network entity 104 may be integrated into another apparatus. For example, network entity 104 may be integrated into gNB 102. For instance, gNB 102 may include hardware that performs the functions of network entity 104, may include virtual resources that perform the functions of network entity 104, may include software that performs the functions of network entity 104, and/or gNB 102 may perform the functions of network entity 104 as an inherent feature of gNB 102.

In some circumstances, a network entity may be implemented across multiple apparatuses. For example, network entity 104 may be implemented across gNB 102 and gNB 103 such that gNB 102 and gNB 103 form a single network entity 104.

Note that while FIG. 2 is described as representing the network entity 104 of FIG. 1, the same or similar structure could be used in one or more of the gNBs 101, 102, and 103.

Although FIG. 2 illustrates an example network entity, various changes can be made to FIG. 2. For example, various components in FIG. 2 could be combined, further subdivided, or omitted and additional components could be added according to particular needs. As a particular example, the processor 210 could be divided into multiple processors, such as one or more central processing units (CPUs).

Figure 3:
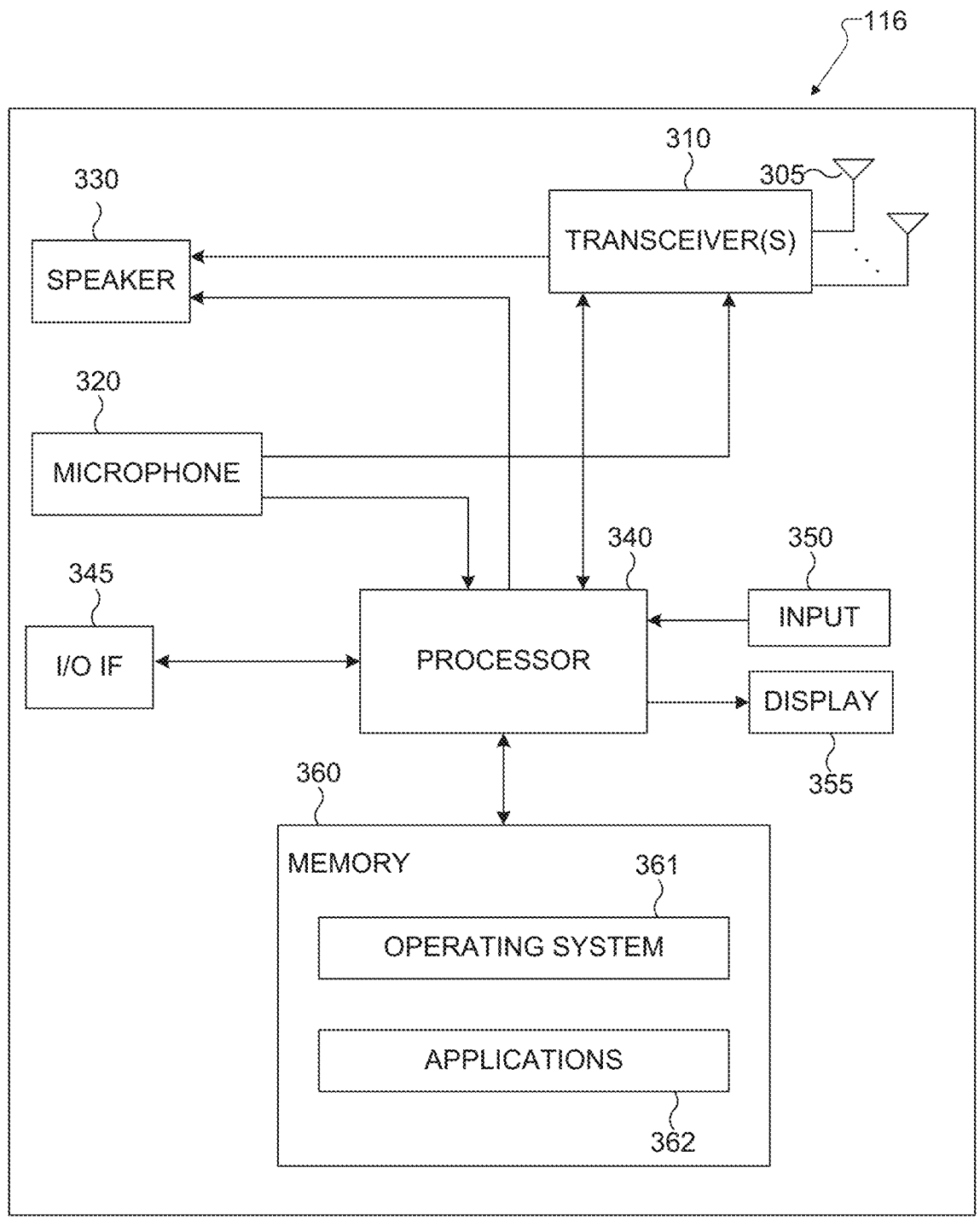
FIG. 3 illustrates an example UE according to embodiments of the present disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the ULE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, for example, processes for supporting distributed MIMO calibration as discussed in greater detail below. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
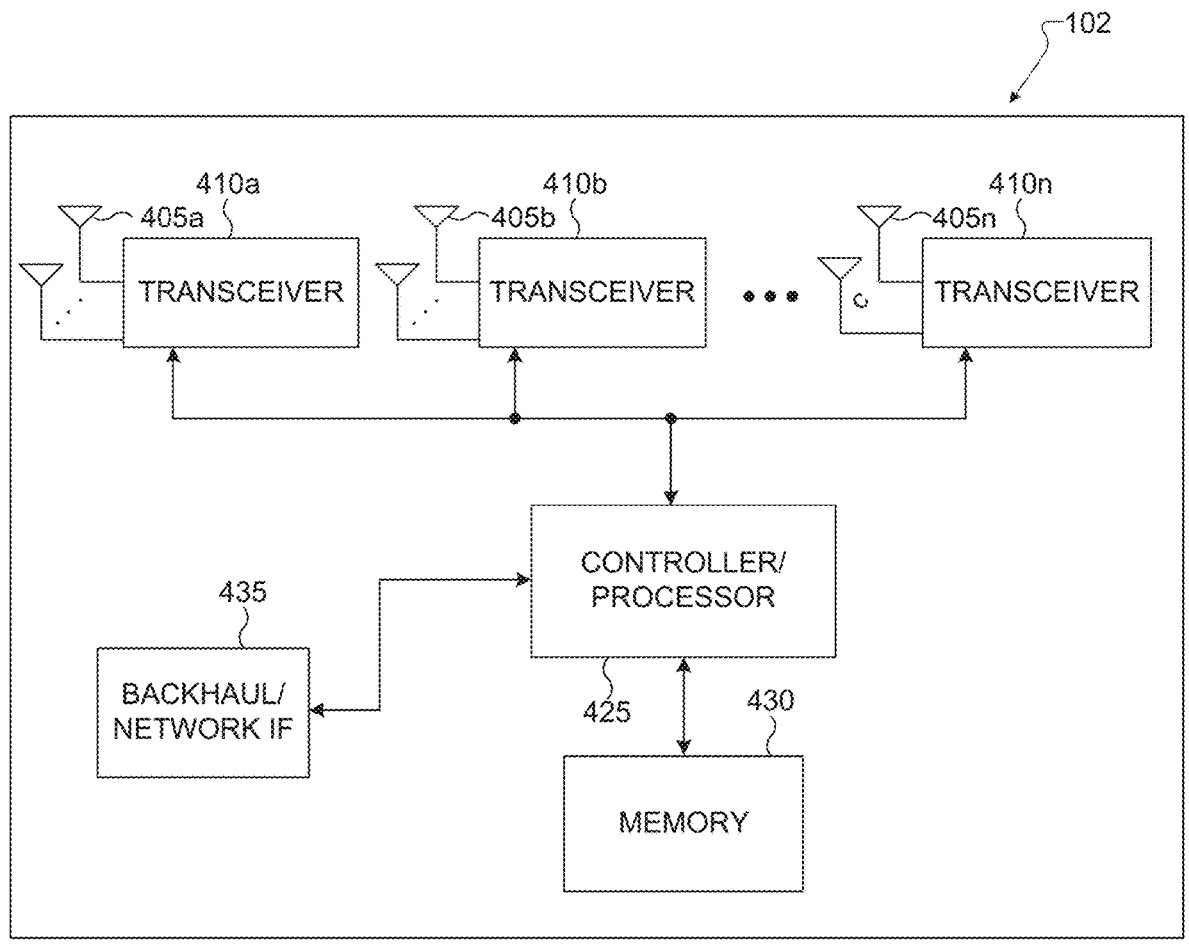
FIG. 4 illustrates an example gNB according to embodiments of the present disclosure.

FIG. 4 illustrates an example gNB 102 according to embodiments of the present disclosure. The embodiment of the gNB 102 illustrated in FIG. 4 is for illustration only, and the gNBs 101 and 103 of FIG. 1 could have the same or similar configuration. However, gNBs come in a wide variety of configurations, and FIG. 4 does not limit the scope of this disclosure to any particular implementation of a gNB.

As shown in FIG. 4, the gNB 102 includes multiple antennas 405a-405n, multiple transceivers 410a-410n, a controller/processor 425, a memory 430, and a backhaul or network interface 435.

The transceivers 410a-410n receive, from the antennas 405a-405n, incoming RF signals, such as signals transmitted by UEs in the network 100. The transceivers 410a-410n down-convert the incoming RF signals to generate IF or baseband signals. The IF or baseband signals are processed by receive (RX) processing circuitry in the transceivers 410a-410n and/or controller/processor 425, which generates processed baseband signals by filtering, decoding, and/or digitizing the baseband or IF signals. The controller/processor 425 may further process the baseband signals.

Transmit (TX) processing circuitry in the transceivers 410a-410n and/or controller/processor 425 receives analog or digital data (such as voice data, web data, e-mail, or interactive video game data) from the controller/processor 425. The TX processing circuitry encodes, multiplexes, and/or digitizes the outgoing baseband data to generate processed baseband or IF signals. The transceivers 410a-410n up-converts the baseband or IF signals to RF signals that are transmitted via the antennas 405a-405n.

The controller/processor 425 can include one or more processors or other processing devices that control the overall operation of the gNB 102. For example, the controller/processor 425 could control the reception of UL channel signals and the transmission of DL channel signals by the transceivers 410a-410n in accordance with well-known principles. The controller/processor 425 could support additional functions as well, such as more advanced wireless communication functions. For instance, the controller/processor 425 could support beam forming or directional routing operations in which outgoing/incoming signals from/to multiple antennas 405a-405n are weighted differently to effectively steer the outgoing signals in a desired direction. Any of a wide variety of other functions could be supported in the gNB 102 by the controller/processor 425.

The controller/processor 425 is also capable of executing programs and other processes resident in the memory 430, such as an OS and, for example, processes to support in distributed MIMO calibration as discussed in greater detail below. The controller/processor 425 can move data into or out of the memory 430 as required by an executing process.

The controller/processor 425 is also coupled to the backhaul or network interface 435. The backhaul or network interface 435 allows the gNB 102 to communicate with other devices or systems over a backhaul connection or over a network. The interface 435 could support communications over any suitable wired or wireless connection(s). For example, when the gNB 102 is implemented as part of a cellular communication system (such as one supporting 5G/NR, LTE, or LTE-A), the interface 435 could allow the gNB 102 to communicate with other gNBs over a wired or wireless backhaul connection. When the gNB 102 is implemented as an access point, the interface 435 could allow the gNB 102 to communicate over a wired or wireless local area network or over a wired or wireless connection to a larger network (such as the Internet). The interface 435 includes any suitable structure supporting communications over a wired or wireless connection, such as an Ethernet or transceiver.

The memory 430 is coupled to the controller/processor 425. Part of the memory 430 could include a RAM, and another part of the memory 430 could include a Flash memory or other ROM.

Although FIG. 4 illustrates one example of gNB 102, various changes may be made to FIG. 4. For example, the gNB 102 could include any number of each component shown in FIG. 4. Also, various components in FIG. 4 could be combined, further subdivided, or omitted and additional components could be added according to particular needs.

For a cellular system operating in low carrier frequency in general, a sub-1 GHz frequency range (e.g., less than 1 GHz) as an example, supporting large number of CSI-RS antenna ports (e.g., 32) or many antenna elements at a single location or remote radio head (RRH) is challenging due to a larger antenna form factor size needed considering carrier frequency wavelength than a system operating at a higher frequency such as 2 GHz or 4 GHz. At such low frequencies, the maximum number of CSI-RS antenna ports that can be co-located at a site (or RRH) can be limited, for example to 8. This limits the spectral efficiency of such systems. In particular, the MU-MIMO spatial multiplexing gains offered due to large number of CSI-RS antenna ports (such as 32) can't be achieved due to the antenna form factor limitation. One way to operate a system with large number of CSI-RS antenna ports at low carrier frequency is to distribute the physical antenna ports to different panels/RRHs, which can be possibly non-collocated. The multiple sites or panels/RRHs can still be connected to a single (common) base unit forming a single antenna system, hence the signal transmitted/received via multiple distributed RRHs can still be processed at a centralized location. For example, the multiple distributed RRHs could be processed by a network entity, such as network entity 104 FIG. 1.

The present disclosure considers such a system (called distributed MIMO or multi-transmission-reception point (mTRP) or coherent joint transmission (CJT)) and proposes methods to perform calibration for the RF receive/transmit antenna network of multiple RRHs/panels in the system to utilize DL/UL channel reciprocity, where the proposed methods can be realized based on Type I single panel codebook and feedback design.

Calibration is an important issue for distributed MIMO in general. Massive MIMO base stations use an on-board coupling network and calibration circuits, which are referred to herein as the on-board calibration for brevity, to measure the gain and phase differences among transceivers in the same radio frequency (RF) unit in order to maintain the reciprocity between DL and UL channels in the TDD system. For the on-board calibration, one RF chain corresponding to one antenna port serves as a reference to other RF chains for other antenna ports. In the case of the distributed MIMO, such reference transceiver's signal needs to be shared between distributed RRHs/panels/modules, which are physically far apart. Using RF cables to distribute the reference is not preferable as it limits the deployment scenarios. In the distributed MIMO, the use of different local oscillators (Los) between distributed antenna modules imposes even more challenges in achieving calibration as the phase of Los could drift. Periodic calibration is needed to compensate for the phase drift as well.

The present disclosure describes over-the-air (OTA) signaling mechanisms and calculation algorithms for calibration among the RRHs/panels of distributed MIMO networks. One of the described mechanisms comprises UL RS transmission and UL channel estimation, (beamformed) DL RS transmission/reception based on UL channel estimation and calibration coefficient estimation, multiple CSI (RI/PMI/CQI) reporting, and gNB calculation based on reported CSI.

Although the present disclosure is described based on 3GPP 5G NR communication systems, various embodiments may apply in general to UEs operating with other RATs and/or standards, such as different releases/generations of 3GPP standards (including beyond 5G, 6G, and so on), IEEE standards (such as 802.16 WiMAX and 802.11 Wi-Fi), and so on.

Figure 5:
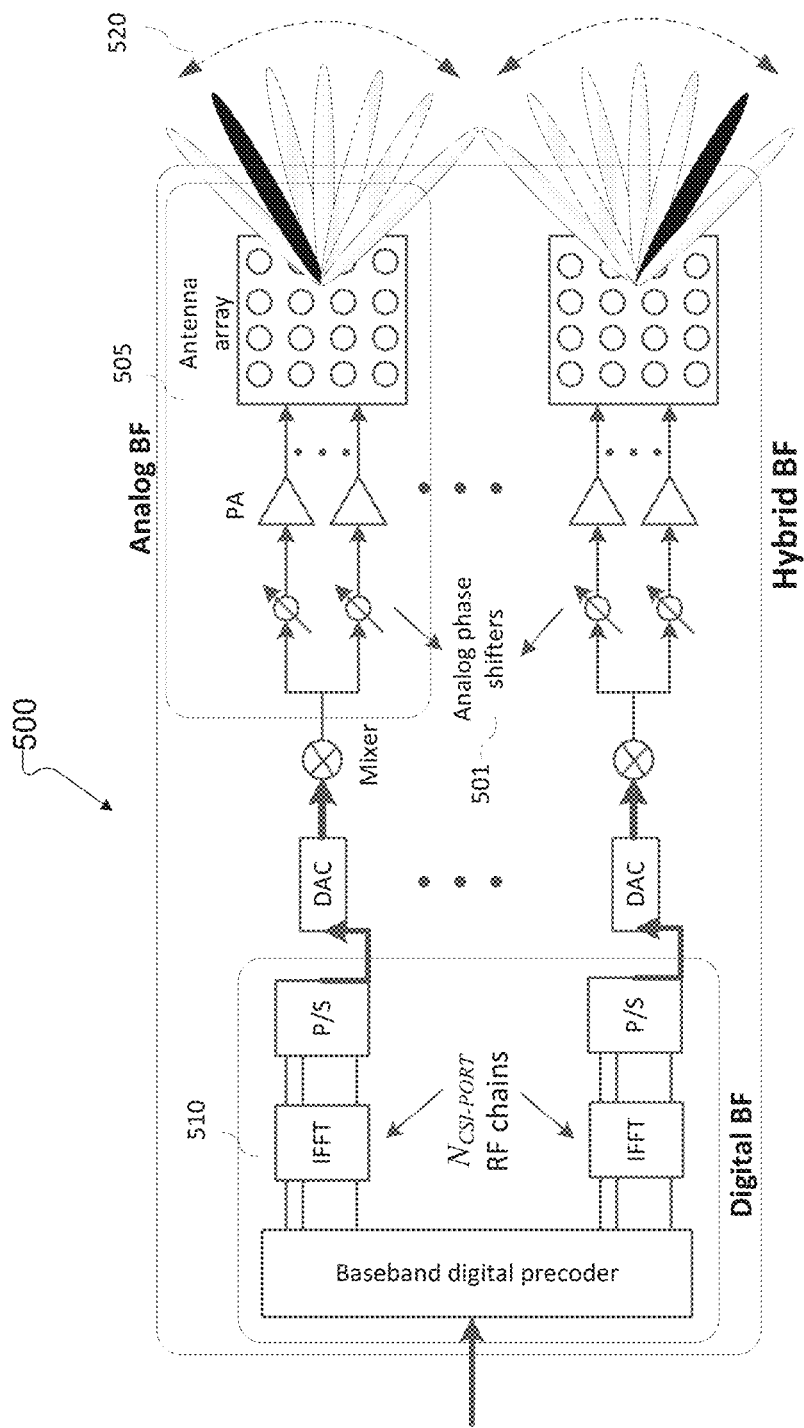
FIG. 5 illustrates an example of antenna blocks or arrays according to embodiments of the present disclosure.

FIG. 5 illustrates an example of antenna blocks or arrays 500 according to embodiments of the present disclosure. The embodiment of the antenna blocks or arrays 500 illustrated in FIG. 5 is for illustration only. Different embodiments of antenna blocks or arrays 500 could be used without departing from the scope of this disclosure.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 5. In this case, one CSI-RS port is mapped onto a large number of antenna elements which can be controlled by a bank of analog phase shifters 501. One CSI-RS port can then correspond to one sub-array which produces a narrow analog beam through analog beamforming 505. This analog beam can be configured to sweep across a wider range of angles (520) by varying the phase shifter bank across symbols or subframes. The number of sub-arrays (equal to the number of RF chains) is the same as the number of CSI-RS ports NCSI-PORT. A digital beamforming unit 510 performs a linear combination across NCSI-PORT analog beams to further increase precoding gain. While analog beams are wideband (hence not frequency-selective), digital precoding can be varied across frequency sub-bands or resource blocks. Receiver operation can be conceived analogously.

Although FIG. 5 illustrates one example of example antenna blocks or arrays 400, various changes may be made to FIG. 5. For example, the example antenna blocks or arrays 500 could include any number of each component shown in FIG. 5. Also, various components in FIG. 5 could be combined, further subdivided, or omitted and additional components could be added according to particular needs.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @100 m distance), larger number of and sharper analog beams (hence larger number of radiators in the array) will be needed to compensate for the additional path loss.

At lower frequency bands such as FR1 or particularly sub-1 GHz band, on the other hand, the number of antenna elements cannot be increased in a given form factor due to large wavelength if a critical distance ($\geq \lambda/2$) between two adjacent antenna elements is maintained in deployment scenarios. As an example, for the case of the wavelength size ($\lambda$) of the center frequency 600 MHz (which is 50 cm), it requires 4 m for uniform-linear-array (ULA) antenna panel of 16 antenna elements with the half-wavelength distance between two adjacent antenna elements. Considering a plurality of antenna elements is mapped to one digital port in practical cases, the required size for antenna panels at gNB to support a large number of antenna ports, e.g., 32 CSI-RS ports, becomes very large in such low frequency bands, and it leads to the difficulty of deploying 2-D antenna arrays within the size of a conventional form factor. This can result in a limited number of physical antenna elements and, subsequently CSI-RS ports, that can be supported at a single site and limit the spectral efficiency of such systems.

Figure 6:
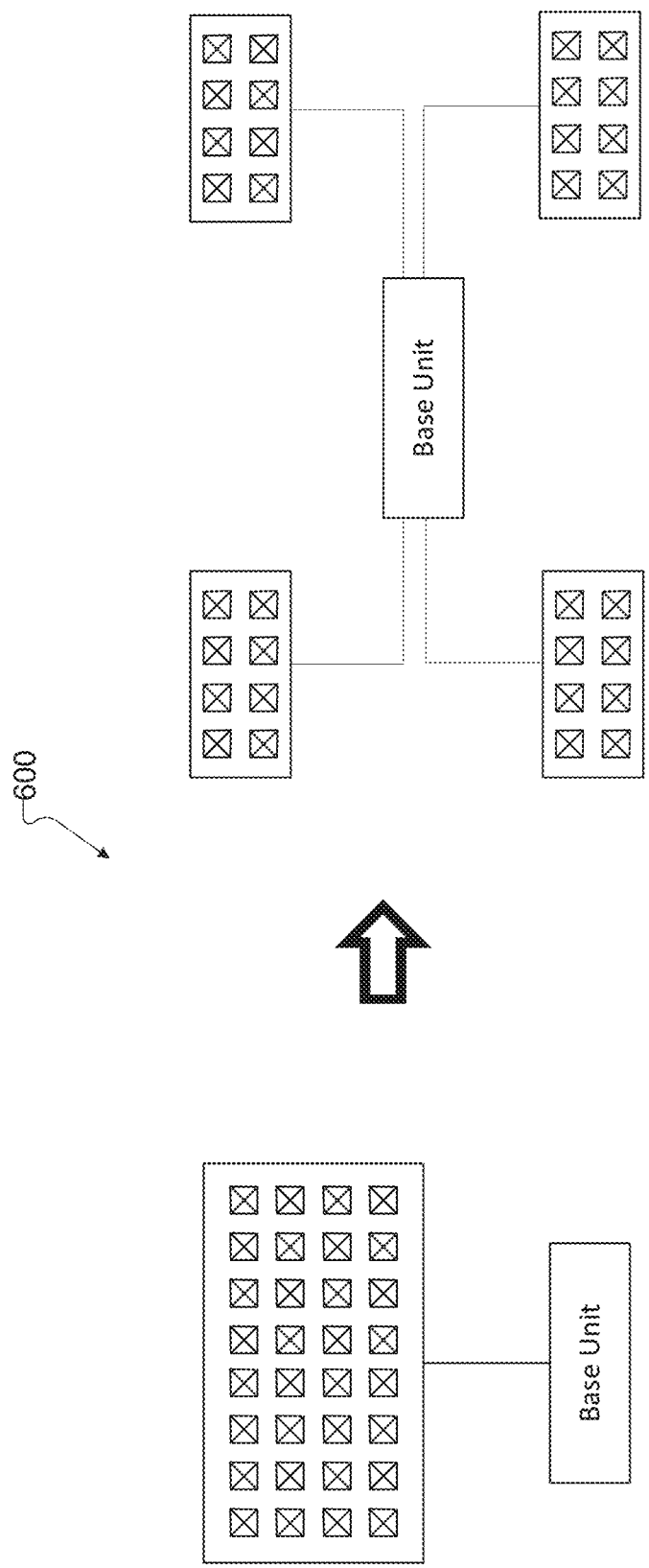
FIG. 6 illustrates an example of distributed MIMO according to embodiments of the present disclosure.

One possible approach to resolve the issue is to form multiple antenna panels (e.g., antenna modules, RRHs) with a small number of antenna ports instead of integrating all of the antenna ports in a single panel (or at a single site) and to distribute the multiple panels in multiple locations/sites (or RRHs), as illustrated in FIG. 6.

FIG. 6 illustrates an example of distributed MIMO 600 according to embodiments of the present disclosure. In the example of FIG. 6, distributed MIMO 600 is formed from multiple antenna panels, such as antenna modules or RRHs, with a small number of antenna ports instead of integrating all the antenna ports in a single panel or at a single site and distributing the multiple panels in multiple locations/sites or RRHs. The example of FIG. 6 may be implemented by a BS. For example, the example of distributed MIMO 600 may be implemented by one or more BSs such as BS 102. The MIMO 600 is for illustration only and other embodiments can be used without departing from the scope of the present disclosure.

Figure 7:
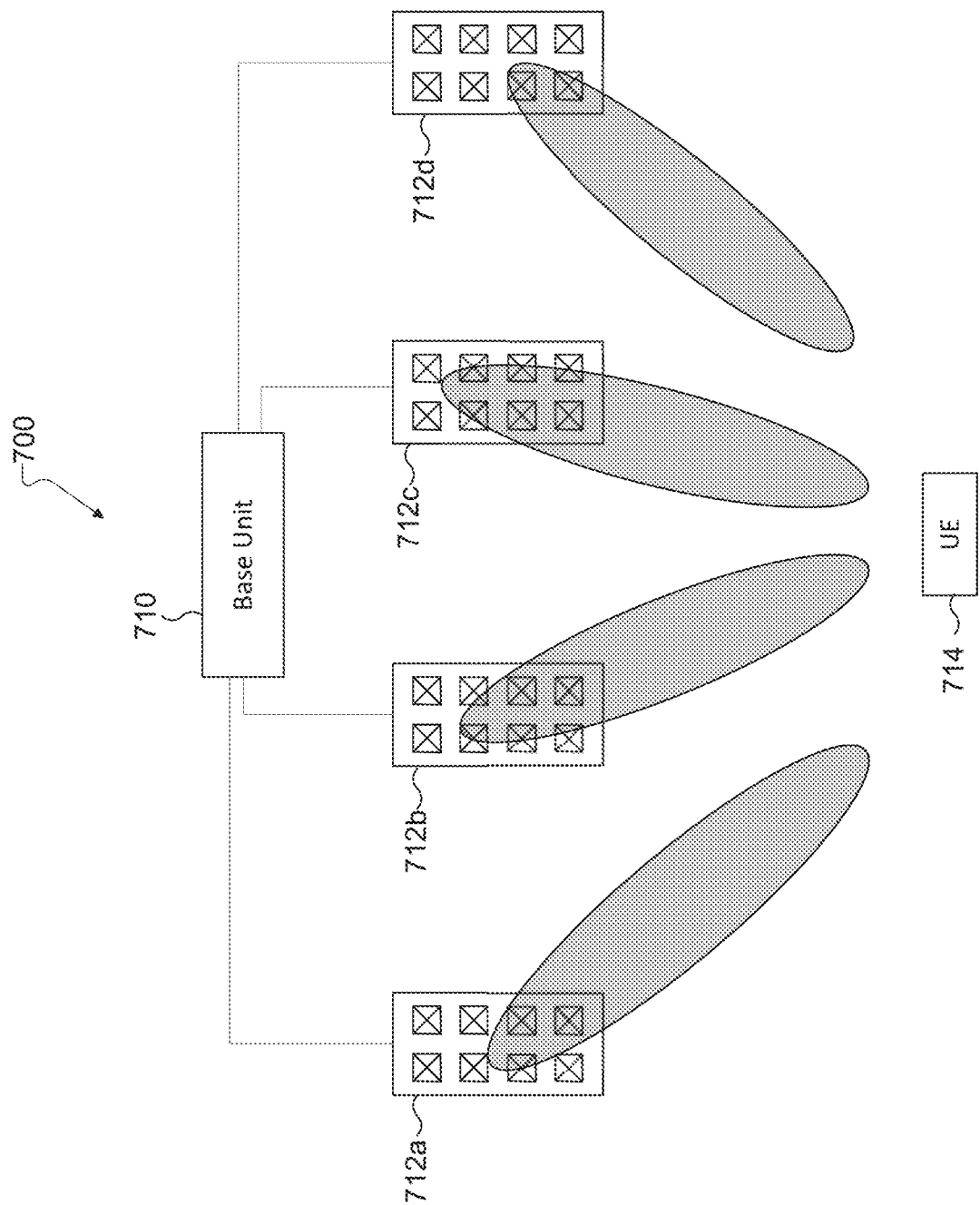
FIG. 7 illustrates an example of distributed MIMO according to embodiments of the present disclosure.

The multiple antenna panels at multiple locations can still be connected to a single base unit, and thus the signal transmitted/received via multiple distributed panels can be processed in a centralized manner through the single base unit, as illustrated in FIG. 7. In another embodiment, it is possible that multiple distributed antenna panels are connected to more than one base units, which communicates with each other and jointly supporting single antenna system.

FIG. 7 illustrates another example of distributed MIMO 700 according to embodiments of the present disclosure. In the example of FIG. 7, multiple antenna locations 712-712d are connected to a single base unit 710. The base unit 710 may process signals transmitted and received via antenna locations 712a-712d in a centralized manner. For example, base unit 710 may process signals transmitted and received to UE 714. The example of FIG. 7 may be implemented by a BS. For example, the distributed MIMO 700 may be implemented by one or more BSs such as BS 102. The example of distributed MIMO 700 is for illustration only and other embodiments can be used without departing from the scope of the present disclosure.

In TDD, a common approach to acquire DL channel state information is to exploit UL channel estimation through receiving UL RSs (e.g., SRS) sent from UE. By using the channel reciprocity in TDD systems, the UL channel estimation itself can be used to infer DL channels. This favorable feature enables NW to reduce the training overhead significantly. However, due to the RF impairment at transmitter and receiver, directly using the UL channels for DL channels is not accurate and it requires a calibration process (periodically) among receive and transmit antenna ports of the RF network at NW. In general, NW has an on-board calibration mechanism in its own RF network to calibrate its antenna panels having a plurality of receiver/transmitter antenna ports, to enable DL/UL channel reciprocity in channel acquisition. The on-board calibration mechanism can be performed via small-power RS transmission and reception from/to the RF antenna network of NW and thus it can be done by NW's implementation in a confined manner (i.e., that does not interfere with other entities). However, it becomes difficult to perform the on-board calibration in distributed MIMO systems due to the distribution of the panels/RRHs over a wide region, and thus it will require over-the-air (OTA) signaling mechanisms to calibrate receive/transmit antenna ports among multiple RRHs/panels far away in distributed MIMO.

The present disclosure proposes UE-assisted calibration mechanisms for distributed MIMO systems. A high-level description of multiple CSI reporting was briefly introduced in U.S. application Ser. No. 17/673,641, which is incorporated by reference in its entirety.

Although low-band TDD systems are exemplified for motivation purposes, the present disclosure can be applied to any frequency band in FR1 and/or FDD systems.

A UE received signal model for f-th sub-carrier with the joint transmission (JT) can be given as:

$$y(f) = \left(h_1^H(f)p_1 + e^{-j(2\pi\Delta\tau f + \Delta\varphi_0)}h_2^H(f)p_2\right)x(f) + n,$$

where $\Delta\tau$: timing mis-match between TRPs;
$\Delta\varphi_0$: common phase mis-match between TRPs; and
$p_i$, $i \in \{1,2\}$: Precoder of i-th TRP.

To achieve gains with diversity JT, sufficient compensation for timing mis-match $\Delta\tau$ and common phase mis-match $\Delta\varphi_0$ between TRP1 and TRP2 is essential. An example of a procedure for achieving such compensation is illustrated in FIG. 8.

Figure 8:
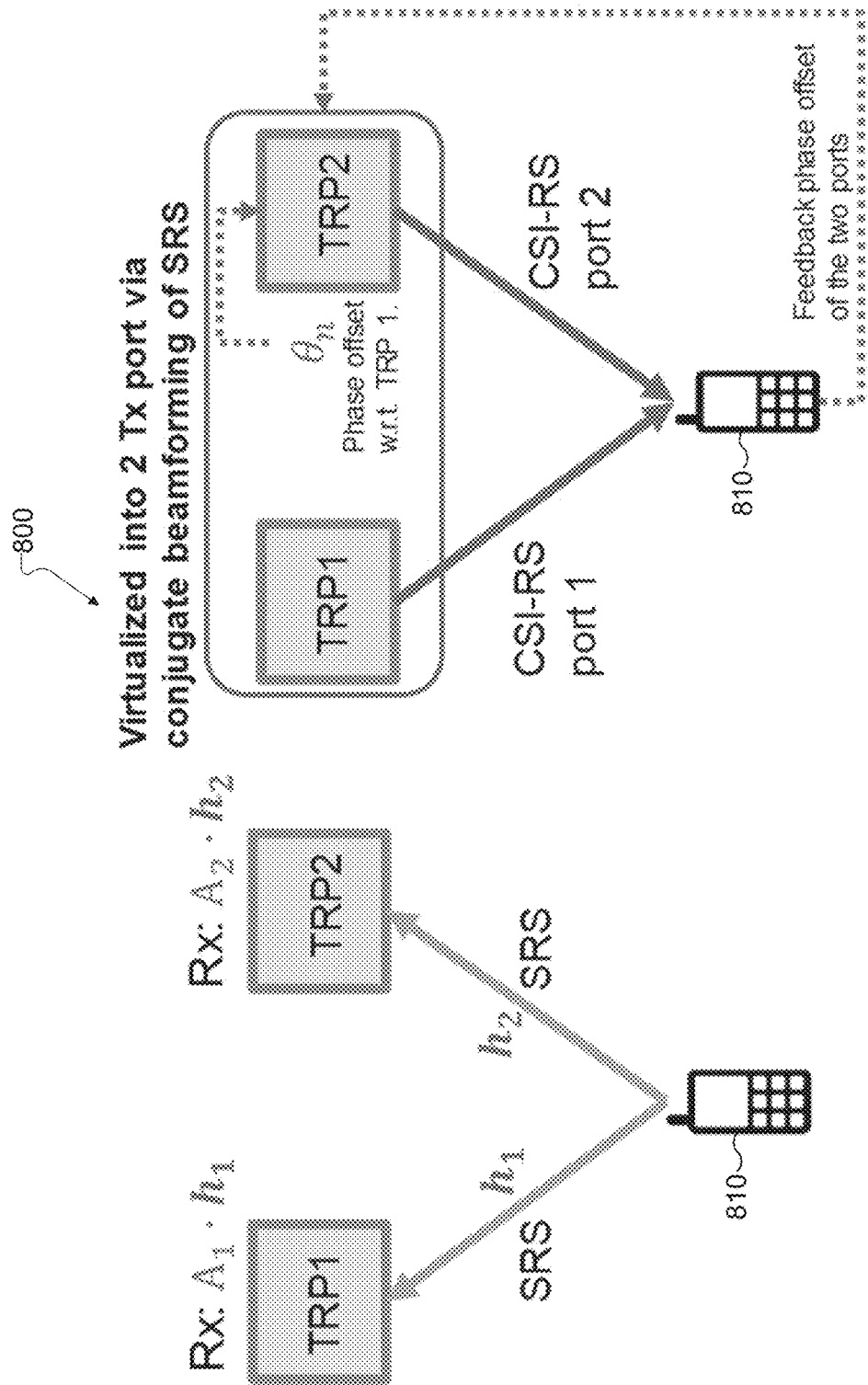
FIG. 8 illustrates an example of UE-aided calibration according to embodiments of the present disclosure.

FIG. 8 illustrates an example 800 of UE-aided calibration according to embodiments of the present disclosure. The embodiment of a UE-aided calibration of FIG. 8 is for illustration only. Different embodiments of a UE-aided calibration could be used without departing from the scope of this disclosure.

In the example of FIG. 8, a UE 810 transmits an SRS which is received by TRP1 and TRP2. The SRS is received with at each TRP with an offset $A_i$ which is a TRP i common offset with respect to the true channel. To perform coherent joint transmission (CJT), a phase of $x = A_2/A_1$ must be known. To obtain the phase of $A_2/A_1$, the two TRPs are virtualized into two TX ports of a CSI-RS resource via conjugate beamforming of SRS. Then, for a number of iterations N (e.g., N=3), TRP1 and TRP2 transmit a CSR-RS based on the virtualized CSS-RS resource, and receive feedback of phase offset of the two ports from UE 810 in the form of a PMI report. At an iteration n, where the number of ports per polarization is $N_1 N_2$:

Port 1: $p_1 = A_1^H h_1/|h_1|$,

Port 2: $p_2 = A_2^H e^{j\theta_n} h_2/|h_2|$, the received signal at UE 810 ("1" sent)

$$y_1 = A_1^H h_1^H \cdot p_1 + n_1 = A_1^H |h_1| + n_1$$

$$y_2 = A_2^H e^{j\theta_n} |h_2| + n_2$$

Two transmitter (2TX) codebook (CB) wideband (WB) PMI quantizes as $$\left(A_1^H, A_2^H e^{j\theta_n}\right) \sim \left(1, x^H e^{j\theta_n}\right).$$

By combining PMI reports including feedback of phase offset of the two ports of N such measurements, one may estimate the phase of x accurately.

Although FIG. 8 illustrates an example 800 of UE-aided calibration, various changes may be made to FIG. 8. For example, various changes to the number of CSI-RS ports, the number of TRPs, etc. could be made according to particular needs.

Figure 9:
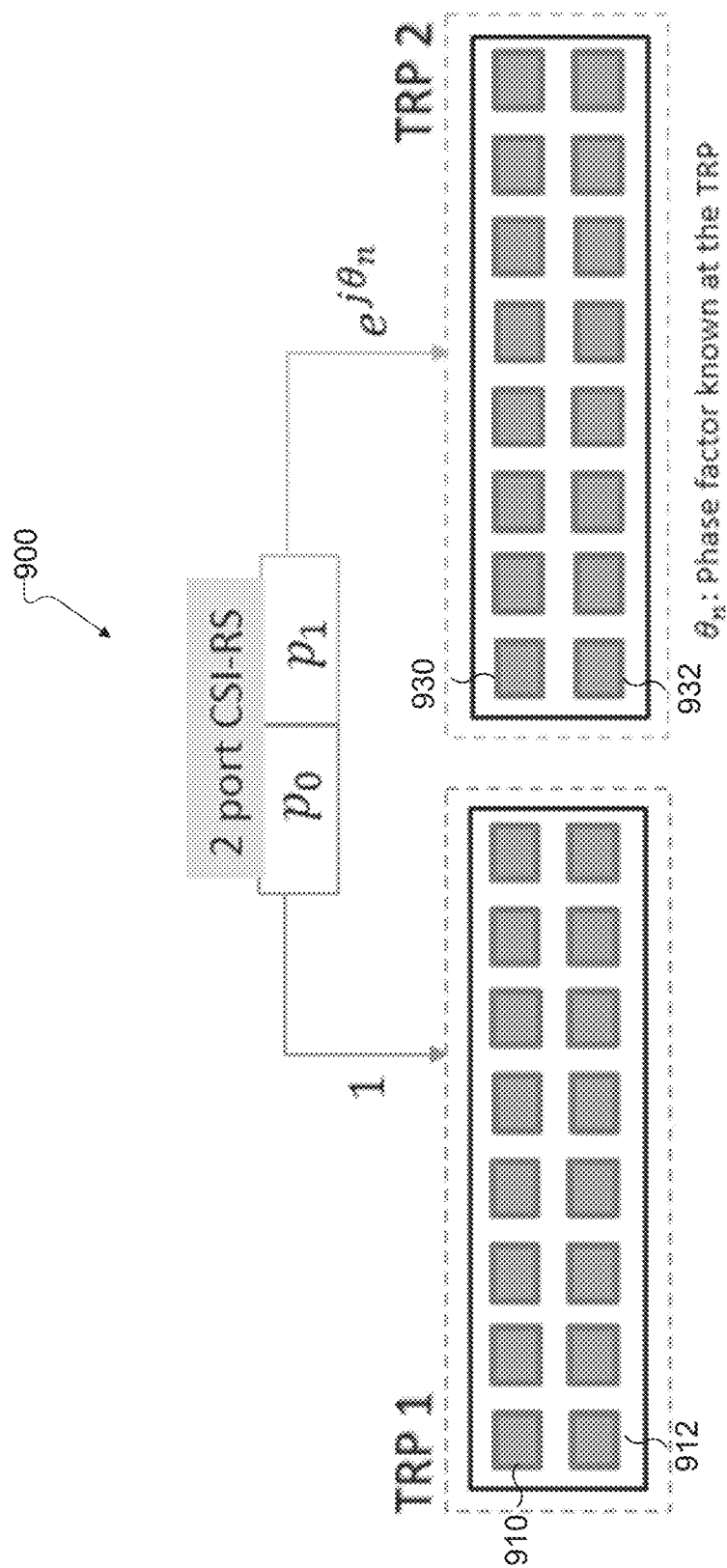
FIG. 9 illustrates an example 2-port CSI-RS resource configuration for phase calibration among two gNBs or TRPs according to embodiments of the present disclosure.

An embodiment of how a 2-port CSI-RS resource can be configured among two gNBs or TRPs for phase calibration purposes is illustrated in FIG. 9.

FIG. 9 illustrates an example 2-port CSI-RS resource configuration 900 for phase calibration among two gNBs or TRPs according to embodiments of the present disclosure. The embodiment of a 2-port CSI-RS resource configuration of FIG. 9 is for illustration only. Different embodiments of a CSI-RS resource configuration could be used without departing from the scope of this disclosure.

In the example of FIG. 9, the terms gNB and TRP interchangeably. Without loss of generality, FIG. 9 illustrates a two TRP case, yet the method described herein can be generalized to more than two TRPs with appropriate SRS and CSI-RS resource configurations.

In the example of FIG. 9 two TRPs, TRP 1 and TRP 2 each comprise sixteen TXRUs. For instance, TRP 1 comprises TXRUs 910 and 912, as well as fourteen additional TXRUs, while TRP 2 comprises TXRUs 930 and 932, as well as fourteen additional TXRUs. TRP 1 and TRP 2 are each assigned with one CSI-RS port from 2-port CSI-RS resource. For example, it can be seen in FIG. 9 that TRP 1 is assigned port $p_0$ and TRP 2 is assigned port $p_1$. In this example, the transmit-receive units (TXRUs) in each TRP are virtualized to a single port. Additionally, the two CSI-RS ports are applied with different virtualization weights as, $[1, e^{j\theta_n}]$.

Although FIG. 9 illustrates an example 2-port CSI-RS resource configuration 900 for phase calibration among two gNBs or TRPs, various changes may be made to FIG. 9. For example, various changes to the number of CSI-RS ports, the number of TXRUs, etc. could be made according to particular needs.

The phase factor $O_n$ at the n-th iteration is identified in a controlled manner based on the reported PMI from a single-layer 2-TX codebook so as to minimize the estimation error. Phase factor $\theta_n$ may also be referred to as a controlled phase offset.

Given the aforementioned 2-port CSI-RS resource transmission from two TRPs, it is worth looking at the necessary radio resource control (RRC) configurations associated with PMI reporting. For instance, in the example of FIG. 8, UE 810 should be configured to report Type I single-panel 2-port codebook which is illustrated in FIG. 10.

FIG. 10 illustrates an example 1000 of a Type I single-panel 2-port codebook according to embodiments of the present disclosure. The embodiment of a Type I single-panel 2-port codebook of FIG. 10 is for illustration only. Different embodiments of a Type I single-panel codebook could be used without departing from the scope of this disclosure.

In the example of FIG. 10, codebooks for 1-layer and 2-layer CSI reporting from table 5.2.2.2.1-1 of 3GPP TS 38.214 are illustrated.

Although FIG. 10 illustrates an example 1000 of a Type I single-panel 2-port codebook, various changes may be made to FIG. 10. For example, various changes to the codebook, the number or layers, etc. could be made according to particular needs.

Note that, since reported PMI should capture relative phase difference between two TRPs, reported PMI needs to be from the 1-layer codebook. To restrict UE to report only rank=1, in one embodiment, RRC parameter twoTX-CodebookSubsetRestriction can be used as illustrated in FIG. 11. With this RRC configuration, UE is configured only to report PMI from 1-layer codebook illustrated in FIG. 10.

FIG. 11 illustrates an example RRC parameter twoTX-CodebookSubsetRestriction 1100 according to embodiments of the present disclosure. The embodiment of a RRC parameter FIG. 11 is for illustration only. Different embodiments of an RRC parameter twoTX-CodebookSubsetRestriction 1100 could be used without departing from the scope of this disclosure.

Although FIG. 11 illustrates an example RRC parameter twoTX-CodebookSubsetRestriction 1100, various changes may be made to FIG. 11 could be made according to particular needs.

Given the aforementioned TXRU virtualization and CSI-RS configurations, the following describes how two CSI-RS ports are applied with different precoding, virtualization weights, and UE processing of received beamformed CSI-RS to identify PMI.

For example, let the channel between UE and TRP i be, $h_i$ ($N_{TXRU} \times 1$), $i \in \{1, 2\}$, which is estimated from SRS transmission. For this example, $N_{TXRU}$ is the number of TXRUs in the i-th TRP. For this example, a single antenna port UE is utilized, though the example can be easily extended for multi antenna port UEs as well.

Considering the above example, in one embodiment, for conjugate beamforming, the precoders applied over two CSI-RS ports at an n-th iteration are given as, $$\text{Port 1: } p_1^n = \frac{h_1}{\|h_1\|} e^{-j(\beta^{tx}+\alpha_1^{Tx})} \tag{1}$$

$$\text{Port 2: } p_2^n = \frac{h_2}{\|h_2\|} e^{-j(\beta^{tx}+\alpha_2^{Tx})} e^{j\theta_n}. \tag{2}$$

Here, $e^{j\beta^{tx}}$ is due to the RF impairment of the TX antenna port of the UE, while $e^{j\alpha_i^{tx}}$ is due to the RF impairment of the RX antenna port of TRP i.

Then, at the UE, the observed 2-port CSI-RS channel can be given as, $$h_{Rx}^n = \begin{bmatrix} \|h_1\| e^{j(\beta^{Rx}+\alpha_1^{tx}-\beta^{Tx}-\alpha_1^{Rx})} \\ \|h_2\| e^{j(\beta^{Rx}+\alpha_2^{tx}-\beta^{Tx}-\alpha_2^{Rx})} e^{j\theta_n} \end{bmatrix} \tag{3}$$

Here, $e^{j\beta^{Tx}}$ is due to the RF impairment of the RX antenna port of UE while $e^{j\alpha_i^{tx}}$ is due to the RF impairment of the TX antenna port of TRP i. Subsequently, the normalized wideband (WB) channel of 2-port CSI-RS can be given as, $$\bar{h}_{Rx}^n = \begin{bmatrix} 1 \\ \frac{\|h_2\|}{\|h_1\|} e^{j(\theta_n+\theta_{TRP})} \end{bmatrix} \tag{4}$$

Here, $\theta_{TRP}=(\alpha_2^{tx}-\alpha_2^{Rx})-(\alpha_1^{tx}-\alpha_1^{Rx})$, which is the parameter to be estimated.

Given $\bar{h}_{Rx}^n$ and since $$\frac{\|h_2\|}{\|h_1\|}$$

is a positive real number, the phase of the selected PMI from table 5.2.2.2.1-1 of TS 38.214 is closest to the term $\theta_n+\theta_{TRP}$, the phase calibration factor $\theta_{TRP}$ can be given as, $$\theta_{I_{sel}} + \Delta\theta_n = \theta_n + \theta_{TRP}$$

where, $\theta_{l_{sel}}$ is the phase of the selected PMI, and $\Delta\theta_n$ is the estimation error.

Assuming $\Delta\theta_n$ is independent and identically distributed with zero mean, $\theta_{TRP}$ after sufficiently large iterations can be estimated as, $$\frac{1}{N}\sum_{n=0}^{N-1}(\theta_{l_{sel}} - \theta_n) = \theta_{TRP}$$

where N is the number of iterations.

In one embodiment, considering conjugate beamforming to each UE antenna port (similar to equation (1) and (2) in single antenna-port case), the observed 2-port CSI-RS channel at p-th UE antenna port can be given as, $$h^n_{p,Rx} = \begin{bmatrix} (\|h_{1,p}\| + \sum_{p' \neq p} h_{1,p} p^n_{1,p}) e^{j(\beta^{Rx} + \alpha^{tx}_1 - \beta^{Tx} - \alpha^{Rx}_1)} \\ (\|h_{2,p}\| + \sum_{p' \neq p} h_{2,p} p^n_{2,p}) e^{j(\beta^{Rx} + \alpha^{tx}_2 - \beta^{Tx} - \alpha^{Rx}_2)} e^{j\theta_n} \end{bmatrix} \quad (5)$$

where, $h_{i,p}$ and $p_{1,p}{}^n$ are the channel and conjugate beamforming vector between TRP i and the p-th UE antenna port, respectively. Subsequently, by appropriately identifying suitable weights, channel observations across different antenna ports can be combined. The resultant channel can then be used for final PMI determination.

In another embodiment, based on UE capability reporting, the UE can be configured to use a single RX antenna port.

As previously described herein, the phase calibration factor may be estimated after a sufficiently large number of iterations of CSI-RS transmission followed by corresponding PMI reports that include feedback of phase offset. However, depending on the rate variation in the channel, the UE may be scheduled to transmit SRS more frequently. The frequency of SRS transmission may be referred to as an SRS periodicity. Depending on the SRS periodicity, it may not be possible for the UE and the TRPs to perform multiple iterations of CSI-RS and PMI reporting between SRS transmission. In some circumstances, an SRS may be transmitted between each CSI-RS and PMI reporting iteration. An example is illustrated in FIG. 12.

Figure 12:
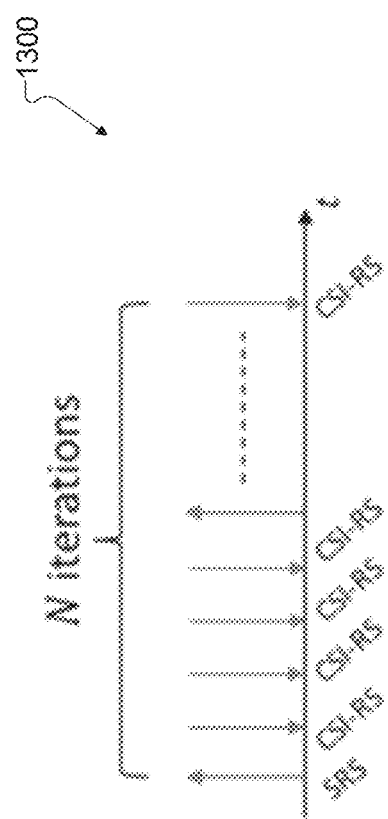
FIG. 12 illustrates an example of SRS periodicity according to embodiments of the present disclosure.

FIG. 12 illustrates an example 1200 of SRS periodicity according to embodiments of the present disclosure. The example SRS periodicity of FIG. 12 is for illustration only. Different embodiments of SRS periodicity could be used without departing from the scope of this disclosure.

In the example of FIG. 12, UE 810, TRP 1, and TRP 2 are configured such that each SRS transmission from UE 810 is followed by a beamformed CSI-RS transmission from TRP 1 and TRP 2. In the example of FIG. 12, there will be N number of such SRS and beamformed CSI-RS pairs to cover N iterations (corresponding to N PMI reports).

Although FIG. 12 illustrates an example 1200 of SRS periodicity, various changes may be made to FIG. 12. For example, various changes to the number of iterations, the number of TRPs, etc. could be made according to particular needs.

Figure 13:
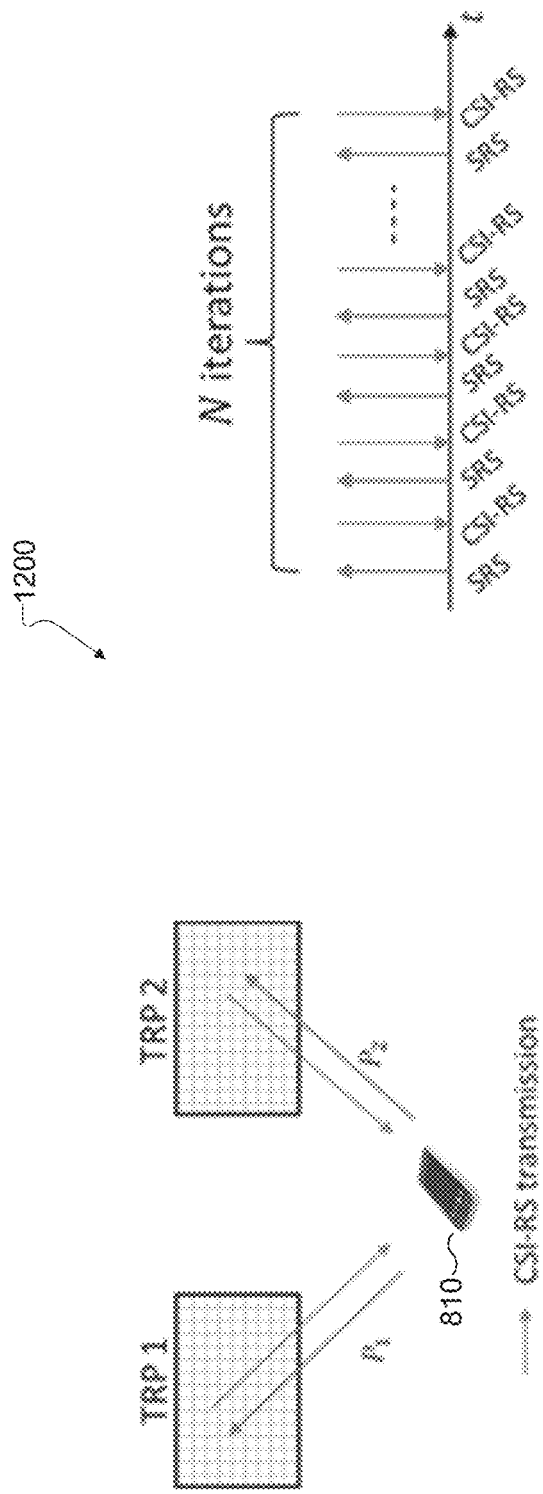
FIG. 13 illustrates an example of SRS periodicity according to embodiments of the present disclosure.

In circumstances where the channel should not vary much between SRS transmissions, the SRS periodicity may be less frequent than depicted in FIG. 12, allowing the UE and the TRPs to perform multiple iterations of CSI-RS and PMI reporting between SRS transmissions such as illustrated in FIG. 13.

FIG. 13 illustrates an example 1300 of SRS periodicity according to embodiments of the present disclosure. The example SRS periodicity of FIG. 13 is for illustration only. Different embodiments of SRS periodicity could be used without departing from the scope of this disclosure.

In the example of FIG. 13, UE 810, TRP 1, and TRP 2 are configured such that each SRS transmission from UE 810 is followed by multiple beamformed CSI-RS transmissions from TRP 1 and TRP 2. In the example of FIG. 12, there will be N number of CSI-RS transmissions to cover N iterations (corresponding to N PMI reports), and a fraction of N SRS transmissions.

Although FIG. 13 illustrates an example 1300 of SRS periodicity, various changes may be made to FIG. 13. For example, various changes to the number of iterations, the number of TRPs, etc. could be made according to particular needs.

CSI-RS resources and reporting can be configured in a number of ways in order to achieve different SRS and beamformed CSI-RS transmissions for TRP calibration purposes. In order to achieve both timing and common phase calibration, PMI reports from two or more different frequency points are utilized.

In one embodiment, to achieve UE-assisted timing and phase calibration over multiple iterations, periodic, semi-persistent or aperiodic CSI-RS reporting can be implemented. For example, the RRC parameter, resourceType and/or reportConfigType can be set to 'periodic', 'semi-persistent' or 'aperiodic' CSI reporting for this purpose. Semi-persistent CSI reporting can be activated/de-activated using a MAC-CE command. Note that, for N iterations, there should be N PMI reports.

In another embodiment, one CSI-RS resource set with one 2-port CSI-RS resource of the type periodic, semi-persistent can be configured using RRC signaling. The periodicity (in slots) for CSI reporting can be configured using RRC parameter slots where x can be 4, 5, 8, 10, 16, 20, 40, 80, 160, 320, 640 as shown in FIG. 14.

FIG. 14 illustrates an example 1400 of periodicity for CSI reporting according to embodiments of the present disclosure. The embodiment of periodicity for CSI reporting of FIG. 14 is for illustration only. Different embodiments of periodicity for CSI reporting could be used without departing from the scope of this disclosure.

In the example of FIG. 14, periodicity for CSI reporting according to 3GPP TS 38.331 is illustrated.

Although FIG. 14 illustrates an example 1400 of a periodicity for CSI reporting, various changes may be made to FIG. 14. For example, various changes to the periodicity, the parameters, etc. could be made according to particular needs.

In another embodiment, an aperiodic CSI-RS report can be triggered for calibration purposes. The associated CSI-RS resource can be, 'periodic', 'semi-persistent' or 'aperiodic.'

Figure 15:
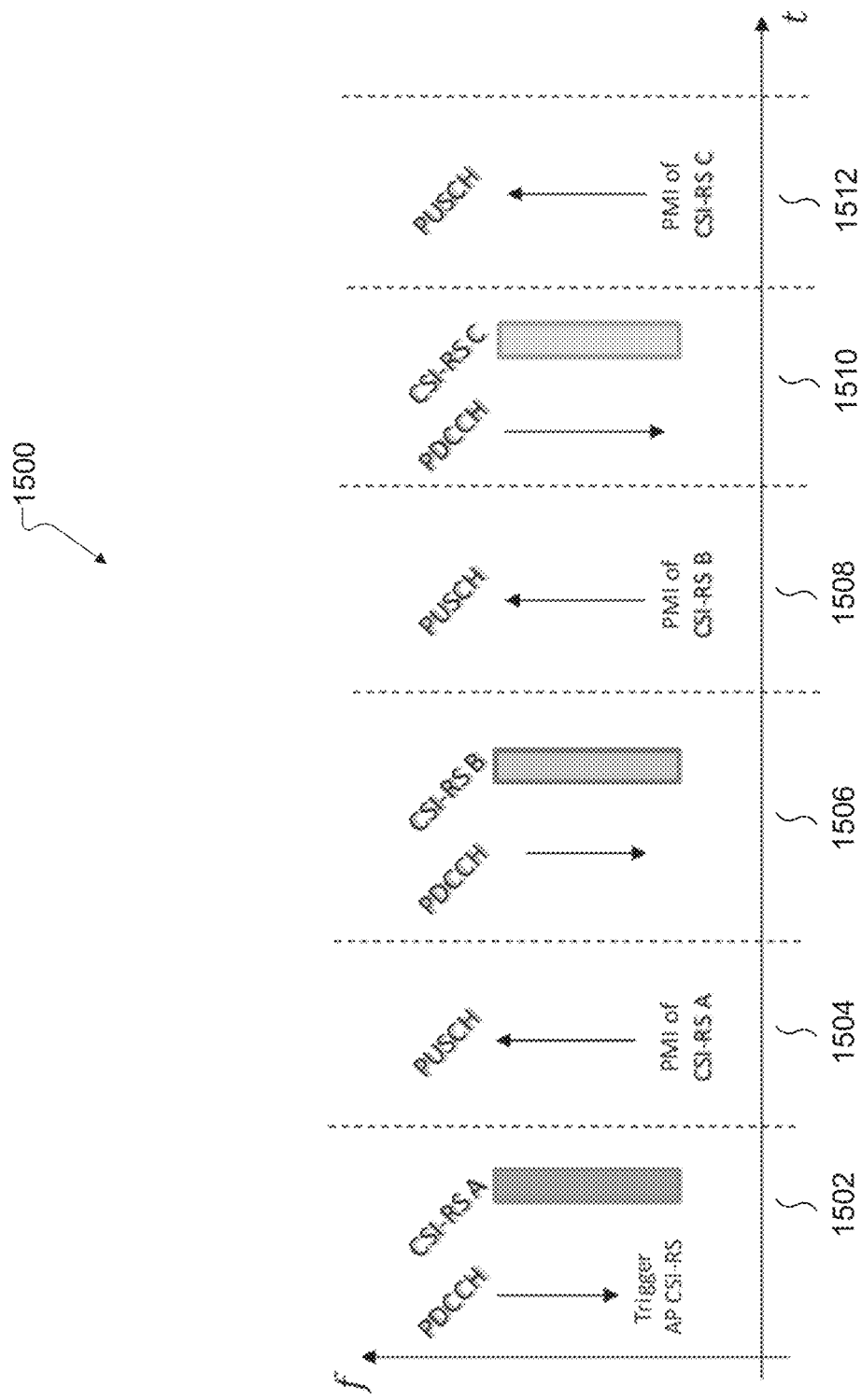
FIG. 15 illustrates an example of aperiodic CSI-RS triggering for different CSI-RS resources according to embodiments of the present disclosure.

FIG. 15 illustrates an example 1500 of aperiodic CSI-RS triggering for different CSI-RS resources according to embodiments of the present disclosure. The embodiment of aperiodic CSI-RS triggering for different CSI-RS resources of FIG. 15 is for illustration only. Different embodiments of aperiodic CSI-RS triggering for different CSI-RS resources could be used without departing from the scope of this disclosure.

In the example of FIG. 15, a UE receives a trigger for an aperiodic CSI-RS report, CSI-RS A at time 1502, and subsequently transmits a PMI report related to CSI-RS A at time 1504. At time 1506, the UE receives a trigger for an aperiodic CSI-RS report, CSI-RS B, and subsequently transmits a PMI report related to CSI-RS B at time 1508. Finally, at time 1510, the UE receives a trigger for an aperiodic CSI-RS report, CSI-RS C, and subsequently transmits a PMI report related to CSI-RS C at time 1512.

In the example of FIG. 15, the different CSI-RS resources can be assigned with different virtualization weights, $e^{j\Theta_n}$. Subsequently, multiple CSI-RS reports with PMI associated with different CSI-RS resources can be used for $B_{TRP}$ estimation as discussed previously.

Although FIG. 15 illustrates an example 1500 of aperiodic CSI-RS triggering for different CSI-RS resources, various changes may be made to FIG. 15. For example, various changes to the periodicity, the number of CSR-RS resources, etc. could be made according to particular needs.

Figure 16:
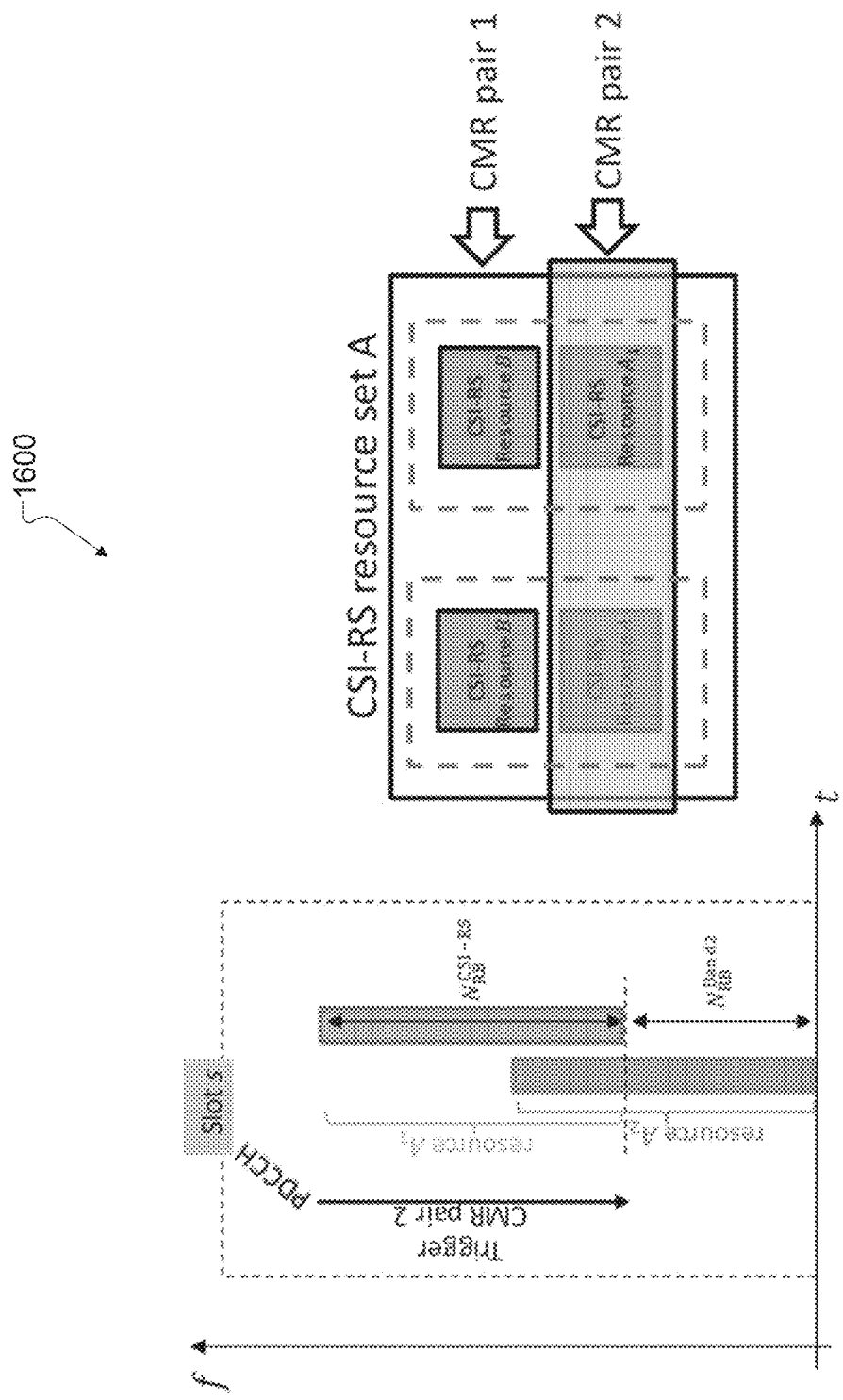
FIG. 16 illustrates an example of two CSI-RS resources covering different portions of bandwidth according to embodiments of the present disclosure.

In one embodiment, a pair of CSI-RS resources is configured within a same resource set, and subsequently aperiodic CSI-RS reporting is triggered for the channel measurement and reporting (CMR) pair containing those CSI-RS resources within the resource set as illustrated in FIG. 16.

FIG. 16 illustrates an example 1600 of two CSI-RS resources covering different portions of bandwidth according to embodiments of the present disclosure. The embodiment of two CSI-RS resources covering different portions of bandwidth of FIG. 16 is for illustration only. Different embodiments of two CSI-RS resources covering different portions of bandwidth could be used without departing from the scope of this disclosure.

In the example of FIG. 16, CSI-RS resource set A is comprised of two CMR pairs. CMR pair 1 includes CSI-RS resources $B_1$ and $B_2$. CMR pair 2 includes CSI-RS resources $A_1$ and $A_2$. Each of these resources are 2-port CSI-RS resources. During slot s, a UE receives a trigger to transmit CSI associated with CMR pair 2, and the UE transmits separate PMI reports for each of CSI-RS resources $A_1$ and $A_2$. $A_1$ is configured for a different portion of a bandwidth part (BWP) than CSI-RS resource A2, as further illustrated in FIG. 17.

Figure 17:
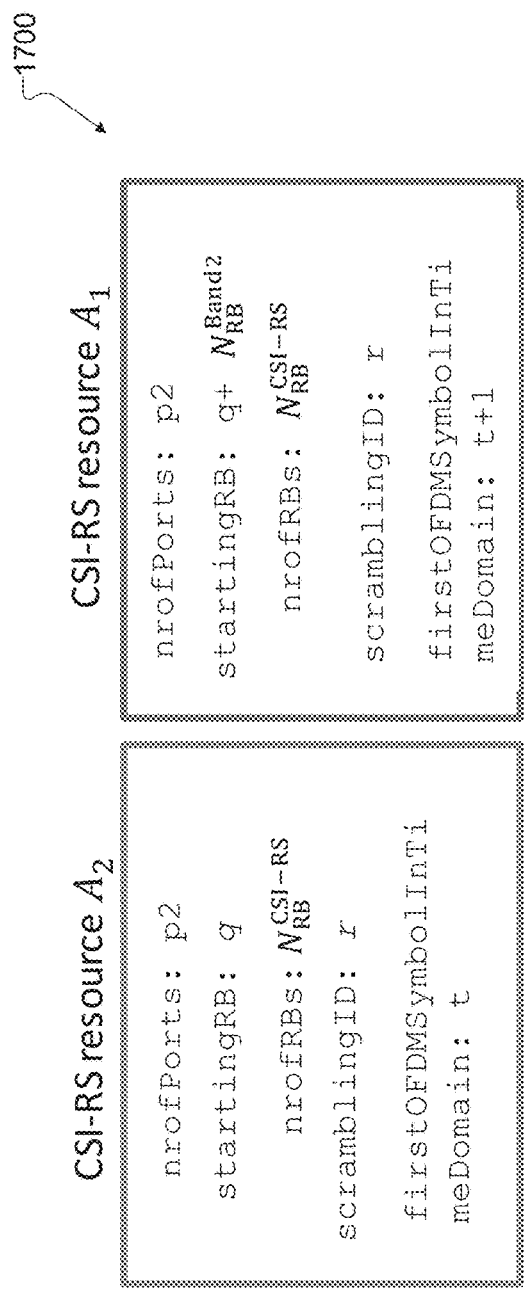
FIG. 17 illustrates an example of two CSI-RS resources configuration for a CMR pair according to embodiments of the present disclosure.

FIG. 17 illustrates an example 1700 of two CSI-RS resources configuration for CMR pair 2 of FIG. 16. The embodiment of two CSI-RS resources configuration of FIG. 17 is for illustration only. Different embodiments of two CSI-RS resources configuration could be used without departing from the scope of this disclosure.

Although FIG. 16 illustrates an example 1600 of two CSI-RS resources covering different portions of bandwidth, various changes may be made to FIG. 16. For example, various changes to the covered bandwidth, the number of CSR-RS resources, etc. could be made according to particular needs.

In another embodiment, a 2-port CSI-RS resource is configured for sub-band reporting to achieve multiple TRP calibration. An example of a CSI-RS resource configured with sub-band size equivalent to 4 is illustrated in FIG. 18.

Figure 18:
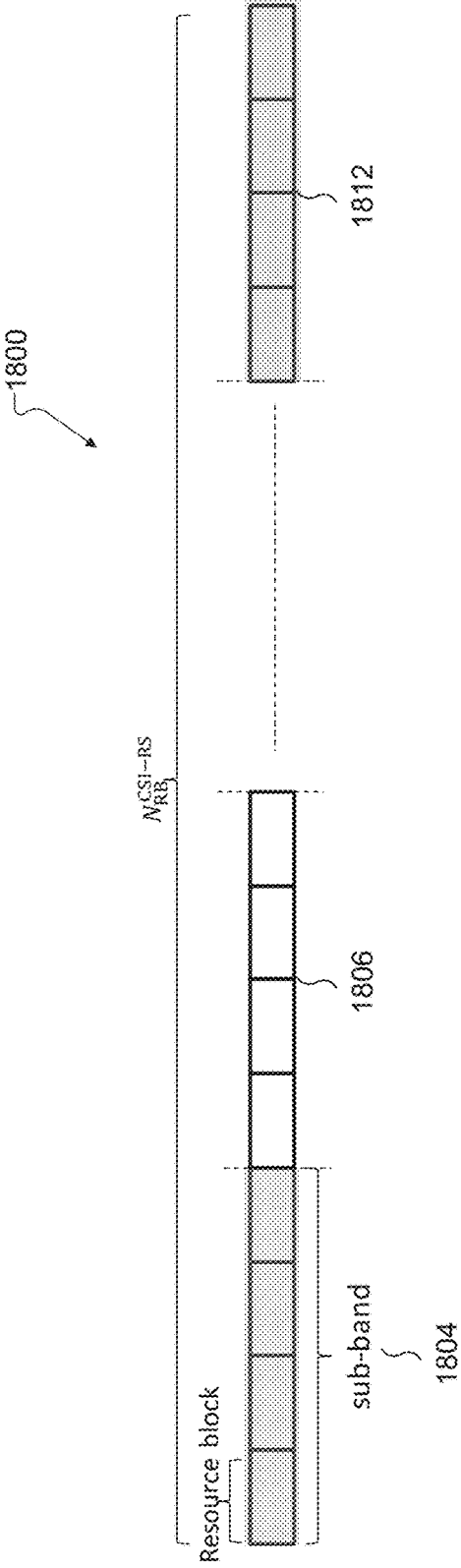
FIG. 18 illustrates an example of a CSI-RS resource configured with a sub-band size of 4 RBs according to embodiments of the present disclosure.

FIG. 18 illustrates an example of a CSI-RS resource 1800 configured with a sub-band size of 4 RBs according to embodiments of the present disclosure. The embodiment of sub-band configuration of FIG. 18 is for illustration only. Different embodiments of sub-band configuration could be used without departing from the scope of this disclosure.

In the example of FIG. 18, the CSI resource 1800 is configured as $N_{RB}^{CSI-RI}$=24 RBs; subbandSize: 4; pmi-FormatIndicator: subbandPMI. It can be seen in FIG. 18, that the CSI-RS resource 1800 includes sub-bands 1804, 1806, and 1812, as well as additional sub-bands that are not illustrated. Each sub-band comprises 4 resource blocks.

Although FIG. 18 illustrates an example of a CSI-RS resource 1800 configured with a sub-band size of 4 RBs, various changes may be made to FIG. 18. For example, various changes to the number of sub-bands, the number of RBs, etc. could be made according to particular needs.

A UE can be configured to report PMI for particular sub-bands using the configuration csi-ReportingBand. For instance, to report PMI for the 1st and 17th sub-band out of 17 sub-bands available, the aforementioned configuration can be used as follows:

subbands17 10000000000000001

Possible csi-ReportingBand configurations from 3GPP TS 38.331 are illustrated in FIG. 19 along with different sub-band sizes as defined in 3GPP TS 38.214

FIG. 19 illustrates an example 1900 of different options for csi-ReportingBand and different sub-band sizes according to embodiments of the present disclosure. The embodiment of the options of FIG. 19 are for illustration only. Different embodiments of options for csi-ReportingBand and different sub-band sizes could be used without departing from the scope of this disclosure.

Although FIG. 19 illustrates an example 1900 of different options for csi-ReportingBand and different sub-band sizes, various changes may be made to FIG. 19. For example, various changes to the number of sub-bands, the sub-band sizes, etc. could be made according to particular needs.

Figure 20:
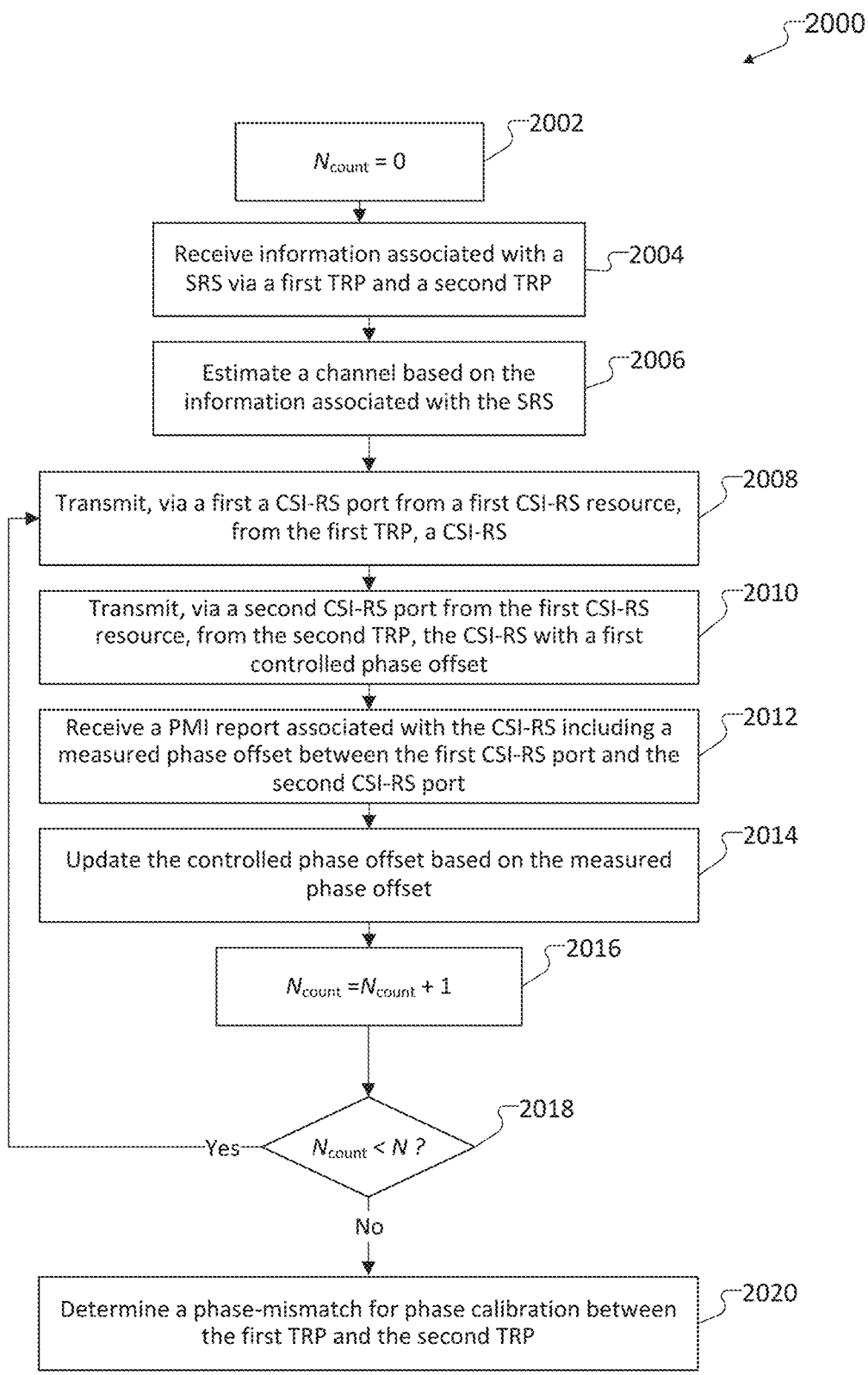
FIG. 20 illustrates a method for distributed MIMO calibration performed by a network entity according to embodiments of the present disclosure.

FIG. 20 illustrates a method 2000 for distributed MIMO calibration performed by a network entity according to embodiments of the present disclosure. An embodiment of the method illustrated in FIG. 20 is for illustration only. One or more of the components illustrated in FIG. 20 may be implemented in specialized circuitry configured to perform the noted functions or one or more of the components may be implemented by one or more processors executing instructions to perform the noted functions. Other embodiments of distributed MIMO calibration performed by a network entity could be used without departing from the scope of this disclosure.

As illustrated in FIG. 20, the method 2000 begins at step 2002. At step 2004, a network entity such as gNB 102 or NE 104 of FIG. 1, receives, via a first TRP and a second TRP, information associated with a SRS from a user equipment UE. At step 2006, the network entity estimates a channel based on the information associated with the SRS. At step 2008, the network entity begins to iterate the series of steps 2008-2014 for a number of iterations N. The number of iterations N is related to a number of PMI reports that include feedback of phase offset used to determine a phase mis-match for phase calibration between the first TRP and the second TRP. In one embodiment, the PMI reports further include feedback used to determine a timing mis-match for timing calibration between the first TRP and the second TRP. For example, the PMI reports may include a report for each of a plurality of sub-bands for a first CSI-RS port and a second CSI-RS port. In the example of FIG. 20, the current iteration of N is represented by a counter $N_{count}$. At step 2008, the network entity transmits, via a first a CSI-RS port from a first CSI-RS resource, from the first TRP, a CSI-RS. At step 2010, the network entity transmits, via a second CSI-RS port from the first CSI-RS resource, from the second TRP, the CSI-RS with a first controlled phase offset. At step 2012, the network entity receives, from the UE, a PMI report associated with the CSI-RS. The PMI report includes a measured phase offset between the first CSI-RS port and the second CSI-RS port. At step 2014 the network entity updates the controlled phase offset, based on the measured phased offset. The current iteration of N is completed at step 2016. At step 2018, if additional PMI reports are needed, the process proceeds back to step 2008 to begin another iteration. If the number of PMI reports are sufficient, the process proceeds to step 2020. At step 2020, based on the controlled phase offset and the measured phase offset, the network entity determines a phase mis-match for phase calibration between the first TRP and the second TRP. In one embodiment, at step 2020, the network entity further determines a timing mis-match for timing calibration between the first TRP and the second TRP.

Although FIG. 20 illustrates one example of a method 2000 for distributed MIMO calibration performed by a network entity, various changes may be made to FIG. 20. For example, while shown as a series of steps, various steps in FIG. 20 could overlap, occur in parallel, occur in a different order, or occur any number of times.

Figure 21:
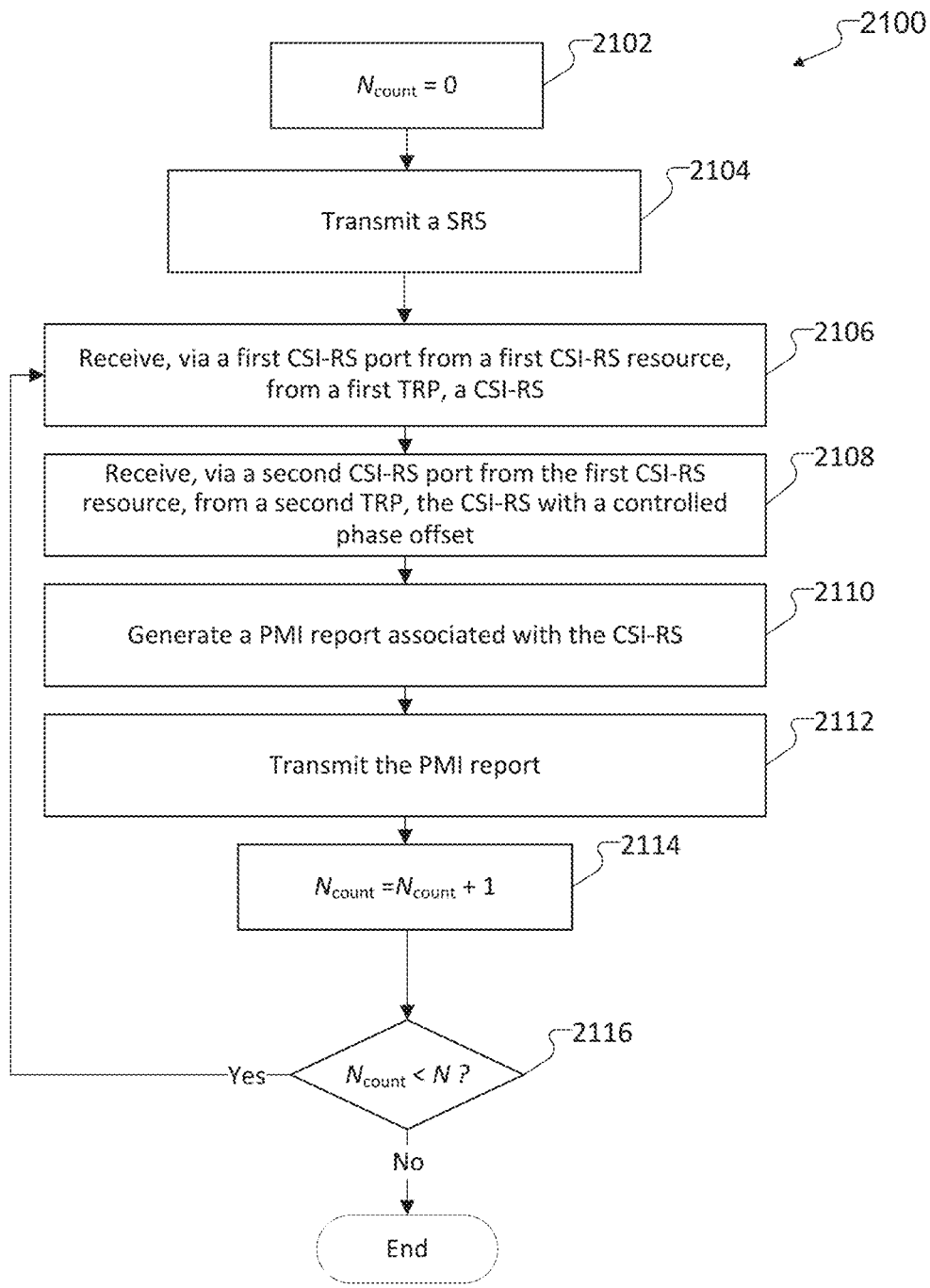
FIG. 21 illustrates a method for distributed MIMO calibration performed by a UE according to embodiments of the present disclosure.

FIG. 21 illustrates a method 2100 for distributed MIMO calibration performed by a UE according to embodiments of the present disclosure. An embodiment of the method illustrated in FIG. 21 is for illustration only. One or more of the components illustrated in FIG. 21 may be implemented in specialized circuitry configured to perform the noted functions or one or more of the components may be implemented by one or more processors executing instructions to perform the noted functions. Other embodiments of distributed MIMO calibration performed by a UE could be used without departing from the scope of this disclosure.

As illustrated in FIG. 21, the method 2100 begins at step 2102. At step 2104, a UE such as UE 810 of FIG. 8, transmits a SRS. At step 2006, the UE begins to iterate the series of steps 2106-2212 for a number of iterations N. The number of iterations N is related to a number of PMI reports including a measured phase offset used to determine a phase mis-match for phase calibration between the a TRP and a second TRP. In one embodiment, the PMI reports further include feedback used to determine a timing mis-match for timing calibration between the first TRP and the second TRP. For example, the PMI reports may include a report for each of a plurality of sub-bands for a first CSI-RS port and a second CSI-RS port. In the example of FIG. 21, the current iteration of N is represented by a counter $N_{count}$. At step 2106, the UE, receives, via a first CSI-RS port from a first CSI-RS resource, from a first TRP, a CSI-RS. At step 2108, the UE receives, via a second CSI-RS port from the first CSI-RS resource, from a second TRP, the CSI-RS with a controlled phase offset. At step 2110, the UE, a generates a PMI report associated with the CSI-RS. The PMI report includes a measured phase offset between the first CSI-RS port and the second CSI-RS port. At step 2112 the UE transmits the PMI report. The current iteration of N is completed at step 2116. At step 2116, if additional PMI reports are needed, the process proceeds back to step 2106 to begin another iteration. Otherwise, If the number of PMI reports is sufficient, the process ends.

Although FIG. 21 illustrates one example of a 2100 for distributed MIMO calibration performed by a UE, various changes may be made to FIG. 21. For example, while shown as a series of steps, various steps in FIG. 21 could overlap, occur in parallel, occur in a different order, or occur any number of times.

Figure 22:
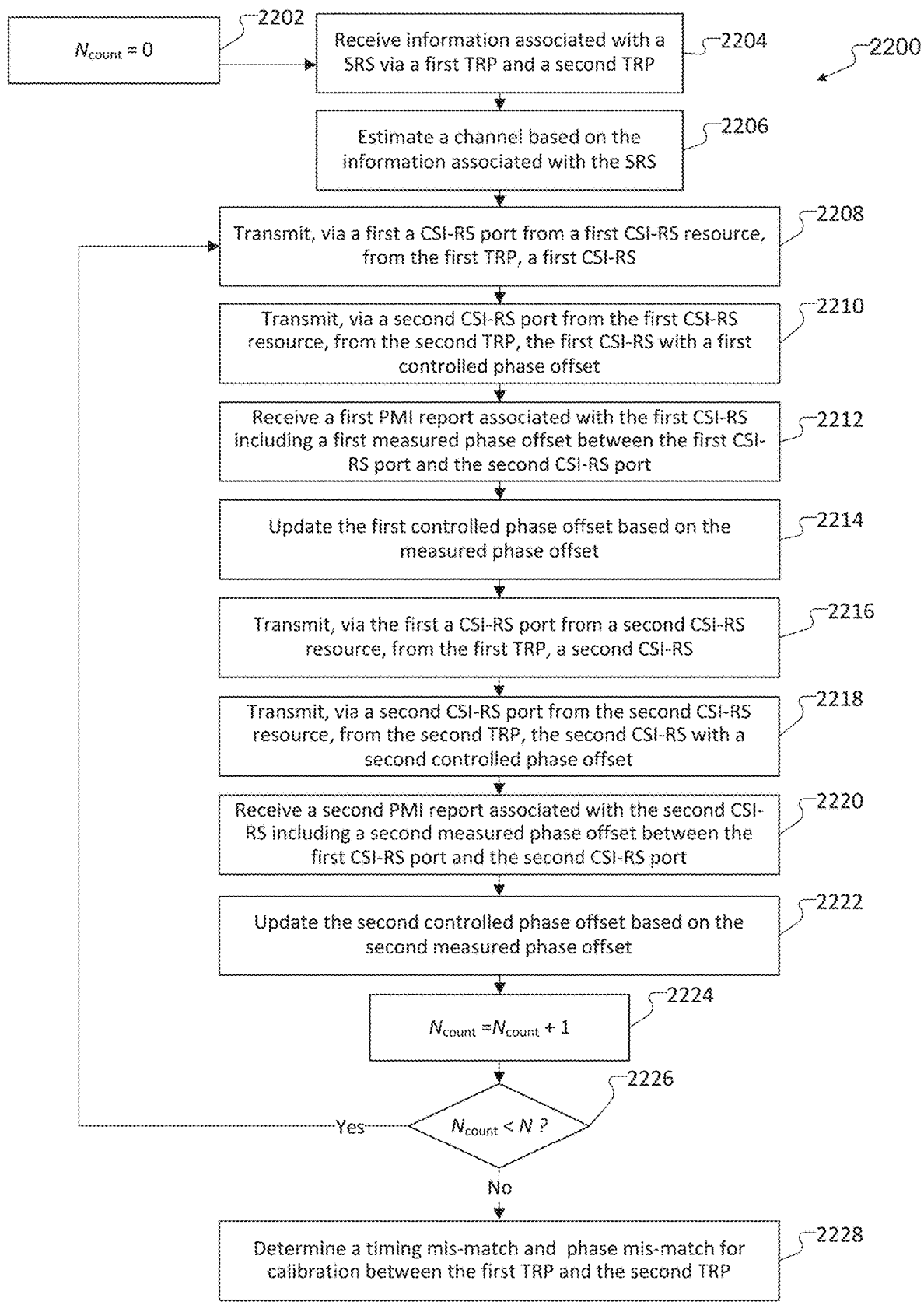
FIG. 22 illustrates a method for distributed MIMO calibration performed by a network entity according to embodiments of the present disclosure.

FIG. 22 illustrates a method 2200 for distributed MIMO calibration performed by a network entity according to embodiments of the present disclosure. An embodiment of the method illustrated in FIG. 22 is for illustration only. One or more of the components illustrated in FIG. 22 may be implemented in specialized circuitry configured to perform the noted functions or one or more of the components may be implemented by one or more processors executing instructions to perform the noted functions. Other embodiments of distributed MIMO calibration performed by a network entity could be used without departing from the scope of this disclosure.

As illustrated in FIG. 22, the method 2200 begins at step 2202. At step 2204, a network entity such as gNB 102 or NE 104 of FIG. 1, receives, via a first TRP and a second TRP, information associated with a SRS from a user equipment UE. At step 2206, the network entity estimates a channel based on the information associated with the SRS. At step 2208, the network entity begins to iterate the series of steps 2208-2222 for a number of iterations N. The number of iterations N is related to a number of PMI reports that include feedback used to determine a timing mis-match for timing calibration, and a phase mis-match for phase calibration between the first TRP and the second TRP. In the example of FIG. 22, the current iteration of N is represented by a counter $N_{count}$. At step 2208, the network entity transmits, via a first a CSI-RS port from a first CSI-RS resource, from the first TRP, a first CSI-RS. At step 2210, the network entity transmits, via a second CSI-RS port from the first CSI-RS resource, from the second TRP, the first CSI-RS with a first controlled phase offset. At step 2212, the network entity receives, from the UE, a first PMI report associated with the first CSI-RS. The first PMI report includes a first measured phase offset between the first CSI-RS port and the second CSI-RS port. At step 2214 the network entity updates the first controlled phase offset, based on the first measured phased offset.

At step 2216, the network entity transmits, via a first a CSI-RS port from a second CSI-RS resource, from the first TRP, a second CSI-RS. At step 2218, the network entity transmits, via a second CSI-RS port from the second CSI-RS resource, from the second TRP, the second CSI-RS with a second controlled phase offset. At step 2220, the network entity receives, from the UE, a second PMI report associated with the second CSI-RS. The second PMI report includes a second measured phase offset between the first CSI-RS port and the second CSI-RS port. At step 2222 the network entity updates the second controlled phase offset, based on the second measured phased offset.

The current iteration of N is completed at step 2224. At step 2226, if additional PMI reports are needed, the process proceeds back to step 2208 to begin another iteration. If the number of PMI reports are sufficient, the process proceeds to step 2228. At step 2228, based on the information from the first and second PMI report, the network entity determines a timing mis-match for timing calibration, and a phase mis-match for phase calibration between the first TRP and the second TRP.

Although FIG. 22 illustrates one example of a method 2200 for distributed MIMO calibration performed by a network entity, various changes may be made to FIG. 22. For example, while shown as a series of steps, various steps in FIG. 22 could overlap, occur in parallel, occur in a different order, or occur any number of times.

Figure 23:
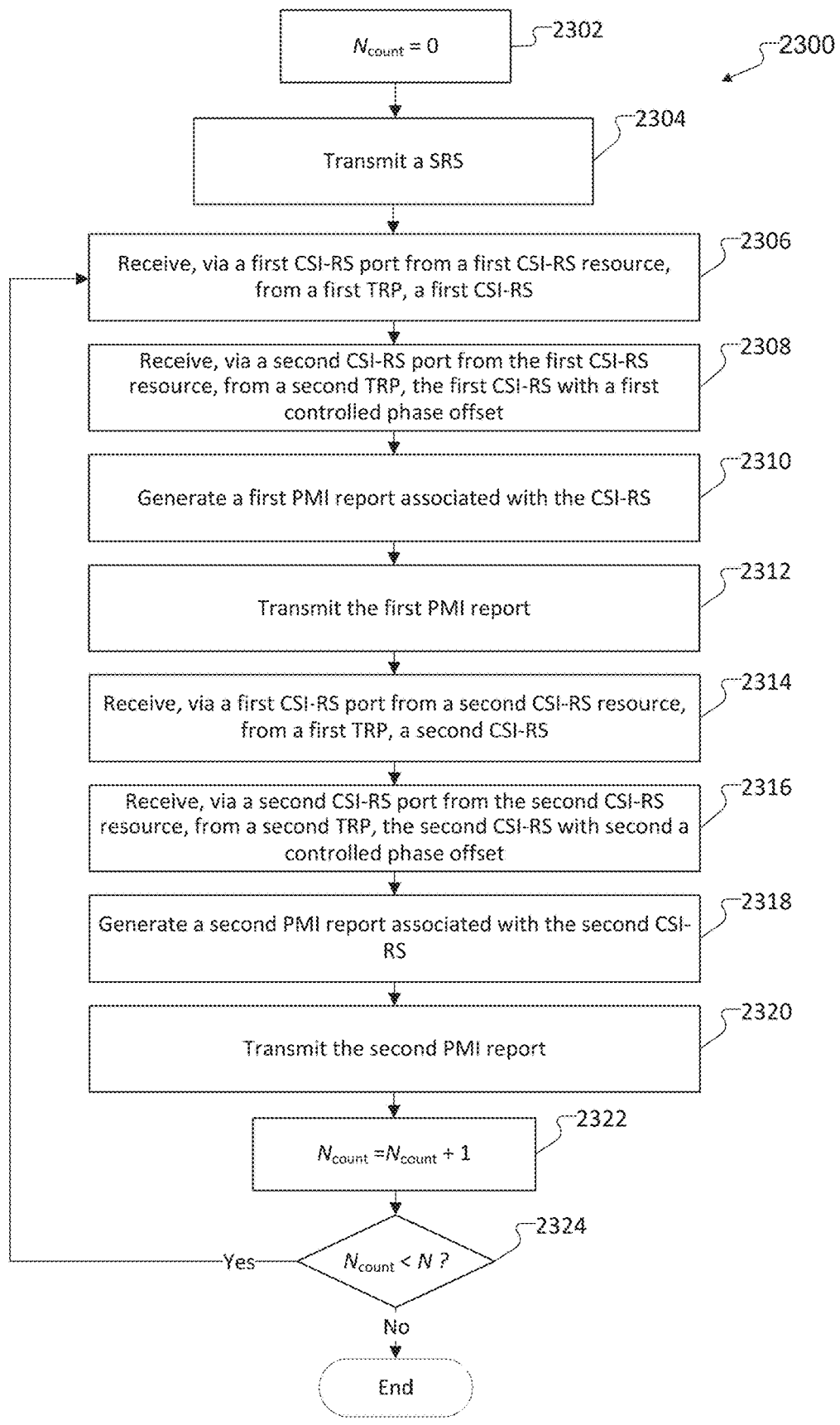
FIG. 23 illustrates a method for distributed MIMO calibration performed by a UE according to embodiments of the present disclosure.

FIG. 23 illustrates a method 2300 for distributed MIMO calibration performed by a UE according to embodiments of the present disclosure. An embodiment of the method illustrated in FIG. 23 is for illustration only. One or more of the components illustrated in FIG. 23 may be implemented in specialized circuitry configured to perform the noted functions or one or more of the components may be implemented by one or more processors executing instructions to perform the noted functions. Other embodiments of distributed MIMO calibration performed by a UE could be used without departing from the scope of this disclosure.

As illustrated in FIG. 23, the method 2300 begins at step 2302. At step 2304, a UE such as UE 810 of FIG. 8, transmits a SRS. At step 2306, the UE begins to iterate the series of steps 2306-2320 for a number of iterations N. The number of iterations N is related to a number of PMI reports including feedback used to determine a timing mis-match for timing calibration, and a phase mis-match for phase calibration between a first TRP and a second TRP. In the example of FIG. 23, the current iteration of N is represented by a counter $N_{count}$. At step 2306, the UE, receives, via a first CSI-RS port from a first CSI-RS resource, from a first TRP, a first CSI-RS. At step 2308, the UE receives, via a second CSI-RS port from the first CSI-RS resource, from a second TRP, the first CSI-RS with a controlled phase offset. At step 2310, the UE generates a first PMI report associated with the first CSI-RS. The PMI report includes a first measured phase offset between the first CSI-RS port and the second CSI-RS port. At step 2312, the UE transmits the first PMI report.

At step 2314, the UE, receives, via a first CSI-RS port from a second CSI-RS resource, from the first TRP, a second CSI-RS. At step 2316, the network entity receives, via a second CSI-RS port from the second CSI-RS resource, from the second TRP, the second CSI-RS with a second controlled phase offset. At step 2318, the UE, a generates a second PMI report associated with the CSI-RS. The PMI report includes a second measured phase offset between the first CSI-RS port and the second CSI-RS port. At step 2320 the UE transmits the second PMI report.

The current iteration of N is completed at step 2322. At step 2324, if additional PMI reports are needed, the process proceeds back to step 2306 to begin another iteration. Otherwise, If the number of PMI reports is sufficient, the process ends.

Although FIG. 23 illustrates one example of a 2300 for distributed MIMO calibration performed by a UE, various changes may be made to FIG. 23. For example, while shown as a series of steps, various steps in FIG. 23 could overlap, occur in parallel, occur in a different order, or occur any number of times.

Any of the above variation embodiments can be utilized independently or in combination with at least one other variation embodiment. The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claim scope. The scope of patented subject matter is defined by the claims.

What is claimed is:

1. A network entity comprising:
a memory; and
a processor operably coupled to the memory, the processor configured to:
 receive, via a first transmit-receive point (TRP) and a second TRP, information associated with a sounding reference signal (SRS) from a user equipment (UE);
 estimate a channel based on the information associated with the SRS;
 for N iterations:
  transmit, via a first channel state information reference signal (CSI-RS) port from a first CSI-RS resource, from the first TRP, a first CSI-RS;
  transmit, via a second CSI-RS port from the first CSI-RS resource, from the second TRP, the first CSI-RS with a first controlled phase offset;
  receive, from the UE, a first precoding matrix indicator (PMI) report associated with the first CSI-RS including a first measured phase offset between the first CSI-RS port and the second CSI-RS port; and
  update the first controlled phase offset, based on the first measured phase offset; and
 after the N iterations, based on the first controlled phase offset and the first measured phase offset, determine a first phase mis-match for phase calibration between the first TRP and the second TRP.

2. The network entity of claim 1, wherein the processor is further configured to:
assign the first CSI-RS port from the first CSI-RS resource to the first TRP;
assign the second CSI-RS port from the first CSI-RS resource to the second TRP;
apply a first virtualization weight to the first CSI-RS port from the first CSI-RS resource; and
apply a second virtualization weight to the second CSI-RS port from the first CSI-RS resource,
wherein the first CSI-RS is transmitted from the first TRP based on the first virtualization weight, and
wherein the first CSI-RS is transmitted from the second TRP based on the second virtualization weight.

3. The network entity of claim 2, wherein at least one of:
a plurality of TXRUs comprised by the first TRP are virtualized to the first CSI-RS port from the first CSI-RS resource; and
a plurality of TXRUs comprised by the second TRP are virtualized to the second CSI-RS port from the first CSI-RS resource.

4. The network entity of claim 1, wherein the processor is further configured to:
for each of the N iterations:
 determine, based on a channel estimation based on the SRS, a precoder for each of a plurality of TXRUs comprised by the first TRP; and
 determine, based on the channel estimation, a precoder and the first controlled phase offset for each of a plurality of TXRUs comprised by the second TRP,
wherein the first CSI-RS is transmitted by the first TRP based on the determined precoder for each of the plurality of TXRUs comprised by the first TRP, and
wherein the first CSI-RS is transmitted by the second TRP based on the determined precoder and the first controlled phase offset for each of the plurality of TXRUs comprised by the second TRP.

5. The network entity of claim 1, wherein:
the UE is configured to report only rank=1 PMI of a two transmitter (2TX) PMI codebook, and
the PMI report received from the UE is generated by the UE based on the configuration to report only rank=1 PMI of the 2TX PMI codebook.

6. The network entity of claim 1, wherein the processor is further configured to:
for each of the N iterations:
transmit, via a first CSI-RS port from a second CSI-RS resource, from the first TRP, a second CSI-RS;
transmit, via a second CSI-RS port from the second CSI-RS resource, from the second TRP, the second CSI-RS with a second controlled phase offset;
receive, from the UE, a second PMI report associated with the second CSI-RS including a second measured phase offset between the first CSI-RS port from the second CSI-RS resource and the second CSI-RS port from the second CSI-RS resource; and
update the second controlled phase offset, based on the second measured phase offset; and
after the N iterations, based on the second controlled phase offset and second first measured phase offset, determine a second phase mis-match for phase calibration between the first TRP and the second TRP.

7. The network entity of claim 6, wherein the processor is further configured to:
assign the first CSI-RS port from the first CSI-RS resource to the first TRP;
assign the second CSI-RS port from the first CSI-RS resource to the second TRP;
apply a first virtualization weight to the first CSI-RS port from the first CSI-RS resource;
assign the first CSI-RS port from the second CSI-RS resource to the first TRP;
assign the second CSI-RS port from the second CSI-RS resource to the second TRP;
apply a first virtualization weight to the first CSI-RS port from the first CSI-RS resource;
apply a second virtualization weight to the second CSI-RS port from the first CSI-RS resource,
apply a third virtualization weight to the first CSI-RS port from the second CSI-RS resource; and
apply a fourth virtualization weight to the second CSI-RS port from the second CSI-RS resource,
wherein:
the first CSI-RS is transmitted from the first TRP based on the first virtualization weight,
the first CSI-RS is transmitted from the second TRP based on the second virtualization weight,
the second CSI-RS is transmitted from the first TRP based on the third virtualization weight, and
the second CSI-RS is transmitted from the second TRP based on the fourth virtualization weight.

8. The network entity of claim 6, wherein the processor is further configured to:
assign the first CSI-RS port from the first CSI-RS resource to the first TRP;
assign the second CSI-RS port from the first CSI-RS resource to the second TRP;
apply a first virtualization weight to the first CSI-RS port from the first CSI-RS resource;
assign the first CSI-RS port from the second CSI-RS resource to the first TRP;
assign the second CSI-RS port from the second CSI-RS resource to the second TRP;
apply a first virtualization weight to the first CSI-RS port from the first CSI-RS resource;
apply a second virtualization weight to the second CSI-RS port from the first CSI-RS resource,
apply a third virtualization weight to the first CSI-RS port from the second CSI-RS resource; and
apply a fourth virtualization weight to the second CSI-RS port from the second CSI-RS resource,
wherein:
the first CSI-RS is transmitted from the first TRP based on the first virtualization weight,
the first CSI-RS is transmitted from the second TRP based on the second virtualization weight,
the second CSI-RS is transmitted from the first TRP based on the third virtualization weight, and
the second CSI-RS is transmitted from the second TRP based on the fourth virtualization weight.

9. The network entity of claim 6, wherein:
the processor is further configured to:
assign the first CSI-RS port from the first CSI-RS resource to the first TRP;
assign the second CSI-RS port from the first CSI-RS resource to the second TRP;
assign the first CSI-RS port from the second CSI-RS resource to the first TRP; and
assign the second CSI-RS port from the second CSI-RS resource to the second TRP;
the first CSI-RS resource and the second CSI-RS resource are comprised by a channel measurement and reporting (CMR) pair;
the first CSI-RS resource corresponds with a first portion of a bandwidth part (BWP);
the second CSI-RS resource corresponds with a second portion of the bandwidth part; and
the processor is further configured to determine, based on the first PMI report and the second PMI report, a timing mis-match for timing calibration between the first TRP and the second TRP.

10. The network entity of claim 1, wherein:
the processor is further configured to:
assign the first CSI-RS port from the first CSI-RS resource to the first TRP; and
assign the second CSI-RS port from the first CSI-RS resource to the second TRP;
the first CSI-RS resource is configured with sub-band reporting for the first CSI-RS port and the second CSI-RS port;
the first PMI report includes a report for each of a plurality of sub-bands for the first CSI-RS port and the second CSI-RS port configured for sub-band reporting by the first CSI-RS resource; and
the processor is further configured to determine, based on the first PMI report, a timing mis-match for timing calibration between the first TRP and the second TRP.

11. A user equipment (UE) comprising:
a processor configured to generate precoding matrix indicator (PMI) reports; and
a transceiver operably coupled to the processor, the transceiver configured to:
transmit a sounding reference signal (SRS); and
for N iterations:
receive, via a first channel state information reference signal (CSI-RS) port from a first CSI-RS resource, from a first TRP, a first CSI-RS;
receive, via a second CSI-RS port from the first CSI-RS resource, from a second TRP, the first CSI-RS with a first controlled phase offset; and
transmit a first PMI report associated with the first CSI-RS including a first measured phase offset between the first CSI-RS port and the second CSI-RS port.

12. The UE of claim 11, wherein:
the first CSI-RS is transmitted from the first TRP based on a first virtualization weight, and
the first CSI-RS is transmitted from the second TRP based on a second virtualization weight.

13. The UE of claim 11, wherein:
the first CSI-RS is transmitted by the first TRP based on a determined precoder for each of a plurality of TXRUs comprised by the first TRP, and
the first CSI-RS is transmitted by the second TRP based on the determined precoder and the first controlled phase offset for each of a plurality of TXRUs comprised by the second TRP.

14. The UE of claim 11, wherein:
the processor is further configured to generate PMI reports that report only rank=1 PMI of a two transmitter (2TX) PMI codebook, and
the transmitted first PMI report associated with the first CSI-RS is generated by the processor based on the configuration to report only rank=1 PMI of the 2TX PMI codebook.

15. The UE of claim 11, wherein the processor is further configured to:
for each of the N iterations:
receive, via a first CSI-RS port from a second CSI-RS resource, from the first TRP, a second CSI-RS;
receive, via a second CSI-RS port from the second CSI-RS resource, from the second TRP, the second CSI-RS with a second controlled phase offset; and
transmit a second PMI report associated with the second CSI-RS including a second measured phase offset between the first CSI-RS port from the second CSI-RS resource and the second CSI-RS port from the second CSI-RS resource.

16. The UE of claim 15, wherein:
the first CSI-RS is transmitted from the first TRP based on a first virtualization weight,
the first CSI-RS is transmitted from the second TRP based on a second virtualization weight
the second CSI-RS is transmitted from the first TRP based on a third virtualization weight, and
the second CSI-RS is transmitted from the second TRP based on a fourth virtualization weight.

17. The UE of claim 15, wherein:
the first CSI-RS resource and the second CSI-RS resource are comprised by a channel measurement and reporting (CMR) pair;
the first CSI-RS resource corresponds with a first portion of a bandwidth part (BWP);
the second CSI-RS resource corresponds with a second portion of the bandwidth part; and
the processor is further configured to determine, based on the first PMI report and the second PMI report, a timing mis-match for timing calibration between the first TRP and the second TRP.

18. The UE of claim 15, wherein:
the first CSI-RS resource is configured with sub-band reporting for the first CSI-RS port and the second CSI-RS port; and
the first PMI report includes a report for each of a plurality of sub-bands for the first CSI-RS port and the second CSI-RS port configured for sub-band reporting by the first CSI-RS resource.

19. A method of operating a network entity, the method comprising:
receiving, via a first transmit-receive point (TRP) and a second TRP, information associated with a sounding reference signal (SRS) from a user equipment (UE);
estimating a channel based on the information associated with the SRS;
for N iterations:
transmitting, via a first channel state information reference signal (CSI-RS) port from a first CSI-RS resource, from the first TRP, a first CSI-RS;
transmitting, via a second CSI-RS port from the first CSI-RS resource, from the second TRP, the first CSI-RS with a first controlled phase offset;
receiving, from the UE, a first precoding matrix indicator (PMI) report associated with the first CSI-RS including a first measured phase offset between the first CSI-RS port and the second CSI-RS port; and
updating the first controlled phase offset, based on the first measured phase offset; and
after the N iterations, based on the first controlled phase offset and the first measured phase offset, determining a first phase mis-match for phase calibration between the first TRP and the second TRP.

20. The method of claim 19, further comprising:
for each of the N iterations:
transmitting, via a first CSI-RS port from a second CSI-RS resource, from the first TRP, a second CSI-RS;
transmit, via a second CSI-RS port from the second CSI-RS resource, from the second TRP, the second CSI-RS with a second controlled phase offset;
receive, from the UE, a second PMI report associated with the second CSI-RS including a second measured phase offset between the first CSI-RS port from the second CSI-RS resource and the second CSI-RS port from the second CSI-RS resource; and
update the second controlled phase offset, based on the second measured phase offset; and
after the N iterations, based on the second controlled phase offset and second first measured phase offset, determine a second phase mis-match for phase calibration between the first TRP and the second TRP.

* * * * *